(12) United States Patent
Takagi et al.

(10) Patent No.: US 7,446,943 B2
(45) Date of Patent: *Nov. 4, 2008

(54) DISPLAY OPTICAL SYSTEM, IMAGE DISPLAY APPARATUS, IMAGE TAKING OPTICAL SYSTEM, AND IMAGE TAKING APPARATUS

(75) Inventors: Akinari Takagi, Tochigi (JP); Shoichi Yamazaki, Kanagawa (JP); Hideki Morishima, Tochigi (JP); Kazutaka Inoguchi, Tochigi (JP); Motomi Matsunaga, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 11/335,566

(22) Filed: Jan. 20, 2006

(65) Prior Publication Data

US 2006/0126188 A1      Jun. 15, 2006

Related U.S. Application Data

(63) Continuation of application No. 10/292,066, filed on Nov. 12, 2002, now Pat. No. 7,012,756.

(30) Foreign Application Priority Data

Nov. 14, 2001  (JP)  .............. 2001-349348
Nov. 14, 2001  (JP)  .............. 2001-349351

(51) Int. Cl.
    *G02B 27/14*  (2006.01)
(52) U.S. Cl. .............. 359/631; 359/630; 359/633
(58) Field of Classification Search .............. 359/631, 359/632, 633, 726, 727, 728, 729, 730, 731, 359/732, 630
See application file for complete search history.

(56) References Cited

U.S. PATENT DOCUMENTS 3,583,790 A    6/1971  Baker
RE27,356 E    5/1972  LaRussa (Continued)

FOREIGN PATENT DOCUMENTS

EP    0 380 035 A2    8/1990

(Continued)

OTHER PUBLICATIONS

Translation of Gist of the reference 1 (Partial English Translation of Japanese Office Action of JP Appln. No. 2001-349348).
Translation of Gist of the reference 2 (Partial English Translation of Japanese Office Action of JP Appln. No. 2001-349351).

*Primary Examiner*—Ricky L Mack
*Assistant Examiner*—Tuyen Q Tra
(74) *Attorney, Agent, or Firm*—Morgan & Finnegan, LLP

(57) ABSTRACT

A display optical system for guiding light from an original picture to an eye of an observer or a surface to have an image projected thereon is provided with a first optical system and a second optical system. The first optical system is provided with a first surface that is formed on a transparent body and has at least a reflecting action, a second surface for reflecting light reflected on the first surface toward the first surface again, and a third surface that is formed on the transparent body in the same manner as the first surface and transmits the light from the original picture. The light transmitted through the third surface travels toward the first surface and reflected for the first time on the first surface. In addition, a principal ray at central angle of view to be reflected for the last time on the first surface is reflected and travels to a side opposite to a side of the first reflection on the first surface with respect to a normal line of a surface on a hit point thereof. With such a structure, a small display optical system that is capable of widening an angle of view is realized.

12 Claims, 19 Drawing Sheets

U.S. PATENT DOCUMENTS

| | | |
|---|---|---|
| 3,697,154 A | 10/1972 | Johnson |
| 4,026,641 A | 5/1977 | Bosserman et al. |
| 4,081,209 A | 3/1978 | Heller et al. |
| 4,322,135 A | 3/1982 | Freeman |
| 4,563,061 A | 1/1986 | Ellis |
| 4,650,292 A | 3/1987 | Baker et al. |
| 4,669,810 A | 6/1987 | Wood |
| 4,775,217 A | 10/1988 | Ellis |
| 4,812,028 A | 3/1989 | Matsumoto |
| 4,874,214 A | 10/1989 | Cheysson et al. |
| 4,969,724 A | 11/1990 | Ellis |
| 5,000,544 A | 3/1991 | Staveley |
| 5,006,072 A | 4/1991 | Letovsky et al. |
| 5,050,962 A | 9/1991 | Monnier et al. |
| 5,093,567 A | 3/1992 | Staveley |
| 5,384,654 A | 1/1995 | Iba |
| 5,416,876 A | 5/1995 | Ansley et al. |
| 5,430,634 A | 7/1995 | Baker et al. |
| 5,436,763 A | 7/1995 | Chen et al. |
| 5,436,765 A | 7/1995 | Togino |
| 5,453,877 A | 9/1995 | Gerbe et al. |
| 5,459,612 A | 10/1995 | Ingleton |
| 5,479,224 A | 12/1995 | Yasugaki et al. |
| 5,483,307 A | 1/1996 | Anderson |
| 5,486,841 A | 1/1996 | Hara et al. |
| 5,486,892 A | 1/1996 | Suzuki et al. |
| 5,506,728 A | 4/1996 | Edwards et al. |
| 5,513,041 A | 4/1996 | Togino |
| 5,539,422 A | 7/1996 | Heacock et al. |
| 5,546,227 A | 8/1996 | Yasugaki et al. |
| 5,594,588 A | 1/1997 | Togino |
| 5,596,433 A | 1/1997 | Konuma |
| 5,598,248 A | 1/1997 | Nagano et al. |
| 5,619,377 A | 4/1997 | Rallison |
| 5,640,632 A | 6/1997 | Koyama et al. |
| 5,663,833 A | 9/1997 | Nanba et al. |
| 5,671,062 A | 9/1997 | Nakamura |
| 5,699,194 A | 12/1997 | Takahashi |
| 5,701,202 A | 12/1997 | Takahashi |
| 5,734,505 A | 3/1998 | Togino et al. |
| 5,748,378 A | 5/1998 | Togino et al. |
| 5,768,024 A | 6/1998 | Takahashi |
| 5,768,025 A | 6/1998 | Togino et al. |
| 5,777,795 A | 7/1998 | Colucci |
| 5,790,312 A | 8/1998 | Togino |
| 5,836,667 A | 11/1998 | Baker et al. |
| 5,875,056 A | 2/1999 | Takahashi |
| 5,917,656 A | 6/1999 | Hayakawa et al. |
| 5,936,773 A | 8/1999 | Togino |
| 6,014,524 A | 1/2000 | Suzuki et al. |
| 6,018,423 A | 1/2000 | Takahashi |
| 6,023,373 A | 2/2000 | Inoguchi et al. |
| 6,084,715 A | 7/2000 | Aoki et al. |
| 6,166,859 A | 12/2000 | Inuzuka et al. |
| 6,195,207 B1 | 2/2001 | Takahashi |
| 6,201,646 B1 | 3/2001 | Togino et al. |
| 6,222,676 B1 | 4/2001 | Togino et al. |
| RE37,175 E | 5/2001 | Takahashi |
| RE37,292 E | 7/2001 | Togino et al. |
| 6,310,736 B1 | 10/2001 | Togino |
| 6,317,267 B1 | 11/2001 | Takahashi |
| 6,433,935 B2 | 8/2002 | Curley et al. |
| 2001/0009478 A1 | 7/2001 | Yamazaki et al. |
| 2001/0048552 A1 | 12/2001 | Koyama et al. |
| 2002/0163742 A1 | 11/2002 | Togino |
| 2003/0049062 A1 | 3/2003 | Machida |

FOREIGN PATENT DOCUMENTS

| | | |
|---|---|---|
| EP | 0 408 344 A2 | 1/1991 |
| EP | 0 618 471 A2 | 10/1994 |
| EP | 0 556 598 B1 | 11/1997 |
| EP | 0 845 692 A3 | 8/1998 |
| EP | 0 583 116 B1 | 4/1999 |
| EP | 0 922 985 A1 | 6/1999 |
| EP | 0 945 748 A2 | 9/1999 |
| GB | 1 578 136 | 11/1980 |
| GB | 2 108 283 A | 5/1983 |
| GB | 2 246 900 A | 2/1992 |
| JP | 62-96627 | 6/1987 |
| JP | 62-214782 | 9/1987 |
| JP | 03-109029 | 5/1991 |
| JP | 8-160340 | 6/1996 |
| JP | 09-33855 | 2/1997 |
| JP | 9-65245 | 3/1997 |
| JP | 9-197336 | 7/1997 |
| JP | 10-153748 | 6/1998 |
| JP | 10-161018 | 6/1998 |
| JP | 10-293235 | 11/1998 |
| JP | 11-337863 | 12/1999 |
| JP | 2000-105338 | 4/2000 |
| JP | 2000-131614 | 5/2000 |
| JP | 2000-199853 | 7/2000 |
| JP | 2000-227554 | 8/2000 |
| JP | 2000-330025 | 11/2000 |
| JP | 2001-264680 | 9/2001 |

DISPLAY OPTICAL SYSTEM, IMAGE DISPLAY APPARATUS, IMAGE TAKING OPTICAL SYSTEM, AND IMAGE TAKING APPARATUS

This application is a continuation application of U.S. patent application Ser. No. 10/292,066 filed on Nov. 12, 2002, now U.S. Pat. No. 7,012,756, which is herein incorporated by reference.

FIELD OF THE INVENTION

The present invention relates to a display optical system that is preferable for image display apparatuses such as a head-mount display and a projector for enlarging to display an original picture displayed on an image display device or the like. The present invention also relates to an image taking optical system that is preferable for an image taking apparatus.

RELATED BACKGROUND ART

There is well known an image display apparatus of a head-mounting type (head-mount display) that uses an image display device such as a CRT or an LCD to enlarge to display an image displayed on the display device via an optical system.

An image display apparatus such as the head-mount display is, in particular, desired to be miniaturized and lightened as the apparatus as a whole in order to be mounted on the head. In addition, when a weight balance, an appearance and the like are taken into account, it is desirable to make the apparatus thin in a visual axis direction of an observer. Moreover, an image is desirably enlarged as much as possible in order to make an enlarged image to be displayed powerful.

FIG. 26 shows a conventional image display apparatus using a coaxial concave mirror. In this apparatus, a light beam from an image displayed on a display device 101 is reflected on a half mirror 102 and caused to be incident on a concave mirror 103, and the light beam reflected on the concave mirror 103 is guided to an eye E of an observer via the half mirror 102. The image displayed on the display device 101 is formed as a virtual image enlarged by the concave mirror 103. Consequently, the observer can observe the enlarged virtual image of the image displayed on the display device 101.

In addition, for example, in Japanese Patent Application Laid-open No. 7-333551 (European counterpart Patent No. EP687932A2), Japanese Patent Application Laid-open No. 8-50256 (European counterpart Patent No. EP687932A2), Japanese Patent Application Laid-open No. 8-160340, Japanese Patent Application Laid-open No. 8-179238 (European counterpart Patent No. EP687932A2) and the like, there is proposed an image display apparatus that uses an LCD (liquid crystal display) as an image display device for displaying an image and a thin prism as an observation optical system to realize thinning of the entire apparatus.

FIG. 27 shows an image display apparatus that is proposed in Japanese Patent Application Laid-open No. 7-333551. In this apparatus, light emitted from an LCD 111 is incident on an incident surface 113 of a small eccentric prism 112. Then, a light beam is returned between a total reflection surface 114 and a reflection surface 115 which are formed in the prism 112 and have curvatures, and thereafter, exits from the eccentric prism 112 through the surface 114 and guided to an eye E of an observer. Consequently, a virtual image of an image displayed on the display device (LCD) 111 is formed, and the observer observes this virtual image.

The reflection surface 115 of the eccentric prism 112 is constituted by an eccentric rotation asymmetrical surface (a surface having different optical power depending on an azimuth angle, a so-called free-form surface).

A type of an optical system shown in FIG. 27 has a characteristic that it is easy to make the entire apparatus thin and make an angle of view of an observation field of vision wide compared with a type using the conventional coaxial concave mirror shown in FIG. 26.

In recent years, definition of an LCD or the like that is a display device for displaying an image has been improved, and an LCD or the like has been developed which is miniaturized while having the same number of pixels compared with that in the past. When such a miniaturized image display device is used, although it is advantageous for miniaturization of an apparatus, it becomes necessary to increase a magnification of an optical system in order to attain the same angle of view as in the past.

In view of such circumstances, Japanese Patent Application Laid-open No. 10-153748 proposes an optical system in which an eccentric prism and a relay lens system are combined, and an intermediate image is once formed by the relay lens system, and then, an image displayed on a display device is guided to an observer. Consequently, a magnification is further improved and an angle of view is widened with respect to an LCD size while maintaining the characteristic that the entire apparatus is thin as shown in FIG. 27.

In addition, as an optical system with more improved optical performance compared with the optical system proposed in Japanese Patent Application Laid-open No. 10-153748, an optical system of a type in which number of internal reflection surfaces of an eccentric prism is increased to form an intermediate image only by the eccentric prism and the image is guided to an observer, an optical system of a type in which a second eccentric prism is added to a first eccentric prism optical system, and the like are proposed in Japanese Patent Application Laid-open No. 2000-066106 (U.S. counterpart patent No. 6,310,736BA), Japanese Patent Application Laid-open No. 2000-105338, Japanese Patent Application Laid-open No. 2000-131614, Japanese Patent Application Laid-open No. 2000-199853 (U.S. counterpart patent No. 6,201, 646BA), Japanese Patent Application Laid-open No. 2000-227554 and Japanese Patent Application Laid-open No. 2000-231060.

In general, an optical system of a type in which an intermediate image is once formed has a problem in that an optical path length is increased and an apparatus becomes large. However, in the optical system proposed in each of the above-mentioned patent applications or patents, miniaturization is attempted through contrivances such as using a surface for carrying out both of a transmitting action and a reflecting action or making light paths intersect.

SUMMARY OF THE INVENTION

The present invention has been devised in view of the above and other drawbacks, and it is an object of the present invention to provide a small display optical system that can attain a display wide angle of view while using a small display device and is small as a whole and an image taking optical system that can attain a photographing wide angle of view with a small size.

In order to attain the above-mentioned object, according to an embodiment of the present invention, there is provided a display optical system for guiding light from an original picture to an eye of an observer or a surface to have light projected thereon or an image taking optical system for guiding light from a subject to an image taking surface, which has a first optical system having at least three surfaces and a second optical system for guiding the light from the original picture to the first optical system or guiding the light from the subject that has exit the first optical system to the image taking surface. This first optical system is formed on a transparent body and has a first surface having at least a reflecting action, a second surface for reflecting light reflected on the first surface toward the first surface again, and a third surface formed on the transparent body in the same manner as the first surface. Then, a principal ray at central angle of view that is to be reflected for the last time on the first surface is reflected and travels to a side that is opposite to a side of the first reflection on the first surface with respect to a normal line of the surface-on a hit point thereof. Note that, in the present invention, wording "the principal ray at central angle of view" means a ray exiting from center of objective plane and passing through center of pupil, or a ray passing through center of pupil and to be incident on to center of image plane.

That is, in the first optical system, light is caused to move generally back and forth among the first, second and third surfaces to return an optical path, whereby a long optical path can be secured despite the fact that the optical system is small. Consequently, if the optical system is applied to a display optical system, a wide display angle of view can be attained while using a small original picture (an image or the like displayed on an image display device) If the optical system is applied to an image taking optical system, a wide photographing angle of view can be attained. Moreover, it becomes possible to realize an optical system that is small as a whole, including the second optical system.

Then, an air space is provided between the third surface of the first optical system and an exit surface of the second optical system, whereby a large number of optical surfaces can be secured and a degree of freedom of optical design can be increased. Thus, it becomes possible to realize improvement of an optical performance as a display optical system and further miniaturization of the optical system.

On the other hand, the third surface of the first optical system and the exit surface of the second optical system are joined, whereby relative positioning of the first and second optical systems is facilitated, occurrence of an aberration at the time of incidence of light on the first optical system is controlled, and at the same time, a strong optical system structure is obtained. Thus, it becomes possible to realize an optical system that is high in an optical performance and excellent in durability.

Further, this display optical system is preferable for an image display apparatus such as a head-mount display (HMD) that an observer mounts on the head to observe an image or a projecting image display apparatus (projector) for enlarging to project an image on a surface to have an image projected thereon such as a screen.

Note that, the image taking optical system is preferable for an image taking apparatus such as a digital still camera or a video camera.

In addition, in both the display optical system and the image taking optical system, it is preferable to form a surface for reflecting and returning light as a curved surface. If the return reflection surface is a plane, since directions of rays of images around it cannot be controlled respectively at the time of reflection, the optical system tends to be large. If the return reflection surface is a rotation asymmetrical surface, since directions of rays of images around it can be controlled freely, it is possible to further miniaturize the optical system compared with the case of a curved surface.

Moreover, the second surface (return reflection surface) is formed as a reflective member separate from the optical element having the first and second surfaces, whereby the number of effective surfaces in an optical path can be increased without affecting sizes of the display optical system and the image taking optical system. Thus, it becomes possible to increase a degree of freedom of design and to realize improvement of an optical performance.

Moreover, a reflective member is formed as a rear surface mirror having a transmission surface and a reflection surface, whereby the transmission surface can also be used as an optical surface. Thus, a focusing performance can be improved without affecting a size of the optical system.

In addition, the first optical system and the second optical system are caused to have positive power, whereby positive power in the entire optical system can be dispersed. Thus, correction of an aberration becomes easy and a focusing performance can be improved.

Further, in other words, the above-mentioned optical system is constituted such that an angle of reflection with respect to a normal line at a hit point of a principal ray at central angle of view that is incident on the first surface first and an angle of reflection with respect to a normal line at a hit point of a principal ray at central angle of view that is reflected on the second surface and incident on the first surface again have opposite signs. That is, the optical system reflects light reflected on the first surface so as to return it to a first reflection area side (a reflection area, an area in the vicinity of the reflection area or an area close to the reflection area) of light on the first surface by the second surface to effectively duplicate optical paths and allow a long optical path to be contained in the small optical system.

DETAILED DESCRIPTION OF THE PREFERRED EMBODIMENTS

Before starting description of an embodiment of the present invention, definitions of a meridian section, a sagittal section, a local meridian section and a local sagittal section used in this embodiment will be described.

In a definition of a conventional system that does not correspond to an eccentric system, when the z axis is assumed to be an optical axis in a vertex coordinate system of each surface, a yz section is a conventional meridian section and an xz section is a sagittal section.

Since an optical system of this embodiment is an eccentric system, a local meridian section and a local sagittal section that correspond to the eccentric system are defined anew.

A surface that includes incident light and exiting light of a principal ray at central angle of view on a hit point of a principal ray at central angle of view (in a display optical system, a ray from a center of an effective display area of an image display surface of a display device to an exit pupil center of a display optical system, and in an image taking optical system, a ray passing through an entrance pupil center of the image taking optical system to reach center of an effective image taking area of an image taking surface of an image taking device) and each surface is defined as a local meridian section. A surface that includes a hit point and is vertical to the local meridian section and parallel with a sagittal section of a vertex coordinate system of each surface (usual sagittal section) is defined as a local sagittal section.

FIRST EMBODIMENT

Figure 1:
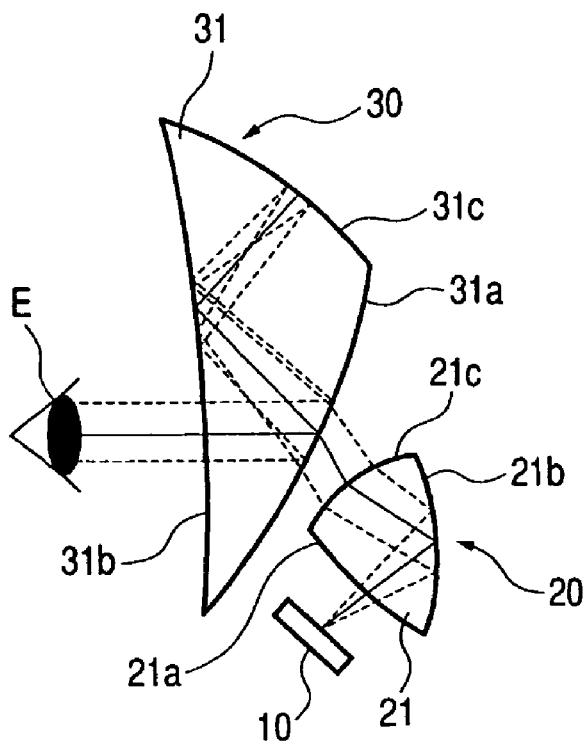
FIG. 1 is a diagram of a display optical system that is First Embodiment of the present invention.

FIG. 1 shows a display optical system that is first Embodiment of the present invention. This display optical system is constituted by a first optical system 30 having positive optical power (1/focal length) as a whole and a second optical system 20 having positive optical power as a whole which are arranged in order from a side of an eye E of an observer toward an image display device (LCD, etc.) 10.

In this embodiment, both the first optical system 30 and the second optical system 20 are constituted with optical surfaces formed on transparent bodies (hereinafter referred to as optical elements, respectively) 31 and 21 the inside of which is filled with an optical medium such as glass or plastics.

Light modulated and emitted by the image display device 10 is incident on the second optical element 21 from a surface 21a, reflected on a surface 21b and transmitted through a surface 21c to exit the second optical element 21. The light that has exit the second optical element 21 from the exit surface 21c is transmitted through a surface 31a (third surface) to be incident on the first optical element 31.

The light incident on the first optical element 31 from the incident surface 31a is reflected on a surface 31b (first surface) and returned and reflected in substantially an opposite direction on a surface 31c (second surface), re-reflected on the surface 31b to a side opposite to a side at the last time the light was reflected with respect to a normal line of a surface on a hit point thereof, reflected on the surface 31a, transmitted through the surface 31b and exits the first optical element 31 to be guided to the eye E of the observer. Further, half mirror coating is applied to the surface 31a.

In this figure, as an example of a light beam emitted from the image display device 10, a principal ray at central angle of view that exits a center of a display surface of the image display device 10 and reaches a center of an exit pupil of the display optical system (corresponding to a position of the eye E of the observer) is indicated by a solid line.

The first optical element 31 and the second optical element 21 are constituted so as to have positive optical power, whereby it becomes possible for the observer to visually recognize an enlarged image of an image displayed on the image display device 10.

As shown in FIG. 1, a reflection surface on the first optical element 31 is arranged eccentrically with respect to the principal ray at central angle of view, whereby an optical path is returned aslant and thinning of the first optical element 31 is realized.

In this case, in order to correct an eccentric aberration caused by eccentrically arranging a surface having optical power, it is preferable to constitute at least one surface among optical surfaces on the first optical element 31 by a rotation asymmetrical surface having different optical power depending on an azimuth angle (so-called free-form surface).

In particular, it is preferable in terms of the correction of an aberration to constitute the surface 31a, which assumes main power of positive optical power of the first optical element 31 as a whole and has a shape of a concave surface toward the eye E of the observer (i.e., convex surface toward the second optical system 20), by a free-form surface.

More preferably, all the optical surfaces on the first optical element 31 are constituted by a free-form surface, whereby a better optical performance can be obtained. In this case, it is preferable to form each rotation asymmetrical surface in a shape that is plane symmetrical in a vertical direction in a paper surface of the figure having a cross section of the paper surface of the figure as an only symmetrical surface because processing and manufacturing can be easily performed compared with the case without symmetricalness.

In this way, when a plurality of rotation asymmetrical surfaces (free-form surfaces) are adopted, it becomes possible to make an aspect ratio of an original picture and an aspect ratio of a displayed image to be close to each other, and it becomes possible to obtain a high quality displayed image.

In the first optical element 31, light passes through each surface in the order of the surface 31a→the surface 31b→the surface 31c→the surface 31b→the surface 31a (→the surface 31b) and, with the reflection on the surface 31c as a boundary, follows the optical paths to that point in the reverse order. The optical path of the surface 31a→the surface 31b→the surface 31c is referred to as a forward path and the optical path of the surface 31c→the surface 31b→the surface 31a is referred to as a backward path. A forward and backward optical path is formed by the forward path and the backward path. Further, the surface 31c is referred to as a return reflection surface.

In this way, the forward and backward optical path is formed in the first optical system 30 with the surface 31c as the return reflection surface, whereby an optical path can be returned so as to duplicate in the first optical element 31, a space in the first optical element 31 can be effectively utilized, and the first optical system 30 can be miniaturized with respect to an optical path length. Consequently, the entire display optical system including the second optical system 20 can be miniaturized.

Incidentally, although miniaturization of the first optical system 30 can be realized by forming the forward and backward optical path, a degree of freedom of design of the optical system decreases because an optical surface is duplicately utilized, and fall in an optical performance, decrease in a manufacturing allowable error or the like is likely to be caused.

However, in this embodiment, the incident surface 31a of the first optical element 31 and the exit surface 21c of the second optical element 21 are arranged to be opposed to each other across an air layer (air space), and are not stuck together but are separately provided. Consequently, the number of effective optical surfaces in the optical path is increased without affecting a size of the optical system, a degree of freedom of design is increased and improvement of an optical performance is realized.

In addition, a difference of indexes of refraction of a medium before and after incidence of light on the surface 31a and the surface 21c can be set to a large value. Thus, since a convex lens action at the time of incidence of light on the surface 31a having a shape of a concave surface toward the eye E of the observer (shape of a convex surface toward the second optical system 20) and the surface 21c having a shape of a convex surface toward the first optical system 30 can be obtained with a small curvature while maintaining the same optical power, occurrence of an aberration can be controlled.

In addition, it is preferable to make the reflection on the surface 31b total reflection because a loss in an amount of light is reduced. Further, at least in an area shared by a reflected light beam and an exiting light beam on the surface 31b, if a reflected light beam is totally reflected, a degree of freedom of design can be increased compared with the case in which all reflected light beams are totally reflected.

In this way, light can be effectively utilized by making reflection on the optical surface having both the transmitting action and reflecting action total reflection.

In addition, as indicated by a dotted line in FIG. 1, a ray exiting from the center of the image display surface of the image display device 10 to reach both the ends of the exit pupil of the display optical system follows the same route as the principal ray at central angle of view in the order of the surface 31a→the surface 31b→the surface 31c→the surface 31b→the surface 31a (→the surface 31b). In this case, the rays from both the ends intersect in the optical path of the first optical system 30, and an intermediate image of the image displayed on the image display device 10 is formed.

Consequently, a degree of freedom of setting a display angle of view with respect to a display size of the image display device 10 is improved, and widening of an angle of view (display of an image at a high magnification) is made possible. In addition, in order to facilitate correction of an aberration in a so-called ocular optical system part that guides an intermediate image to the eye E of the observer as substantially parallel light, the intermediate focusing surface may be formed so as to be appropriately curved, have an astigmatic difference, or be distorted depending on a situation in which a curvature of field, an astigmatism, or a distortion aberration occurs in the ocular optical system part.

In addition, the first optical element 31 and the second optical element 21 can be easily manufactured by being formed from materials of the same index of refraction.

By constituting the display optical system as described above, an image display apparatus can be provided which displays an image displayed on the image display device 10 as an enlarged image with a good optical performance.

In addition, a degree of freedom of setting a display angle of view with respect to a display size of the image display device 10 is improved by focusing light once in the display optical system to make it possible to set an angle of view wider (display an image at a high magnification). At the same time, the total length of the display optical system can be controlled to be short by duplicating optical paths, which become long along with the widening of the angle of view, by forming a forward and backward optical path in the first optical element 31 to constitute a very compact display optical system.

Further, in this embodiment, return reflection of the principal ray at central angle of view on the surface 31c is depicted as substantially vertical reflection. However, the display optical system of the present invention is not limited to this configuration.

SECOND EMBODIMENT

Figure 2:
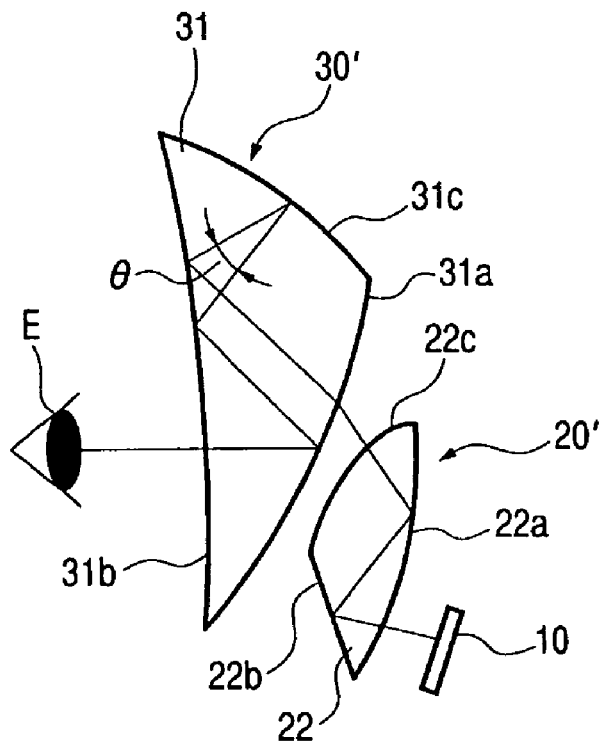
FIG. 2 is a diagram of a display optical system (1) that is second Embodiment of the present invention.
Figure 3:
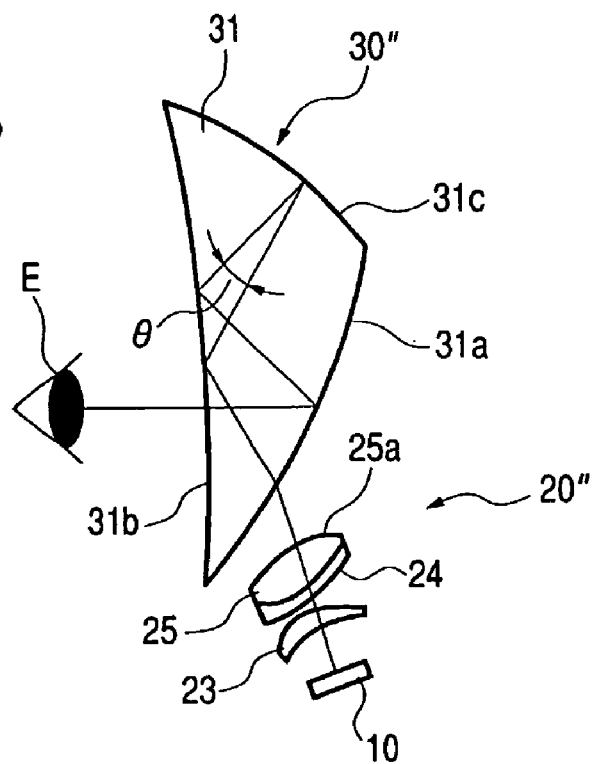
FIG. 3 is a diagram of a display optical system (2) that is second Embodiment of the present invention.

FIGS. 2 and 3 show display optical systems that are second Embodiment of the present invention. First optical systems 30' and 30" and second optical systems 20' and 20", which constitute the display optical system of this embodiment, are different from those in first Embodiment.

In the display optical system shown in FIG. 2, light emitted from an image display device 10 is incident on an optical element (second optical element) 22 constituting the second optical system 20' from a surface 22a, reflected on a surface 22b, totally reflected on the surface 22a and exits the second optical element 22 from a surface 22c. The light that has exit the second optical system 20' from the exit surface 22c is incident on a transparent body (first optical element) 31 constituting the first optical system 30' from a surface 31a.

The light incident on the first optical element 31 from the incident surface 31a is reflected on a surface 31b, returned and reflected on a surface 31c, re-reflected on the surface 31b, reflected on the surface 31a and exits the first optical element 31 from the surface 31b to be guided to an eye E of an observer.

In addition, in the display optical system shown in FIG. 3, light emitted from an image display device 10 is refracted by lenses 23, 24 and 25 of the second optical system 20" and exits from an exit surface 25a to be incident on a transparent body (first optical element) 31 of the first optical system 30". The light incident on the first optical element 31 from the incident surface 31a is reflected on the surface 31b, returned and reflected on the surface 31c, re-reflected on the surface 31b, reflected on the surface 31a and exits the first optical element 31 from the surface 31b to be guided to the eye E of the observer.

Both the display optical systems shown in FIGS. 2 and 3 are the same as the display optical system of first Embodiment in that a forward and backward optical path of the surface 31a→the surface 31b the surface 31c→the surface 31b→the surface 31a→the surface 31b is formed in the first optical systems 30' and 30".

However, the display optical system shown in FIG. 2 is different from the display optical system of first Embodiment in that a principal ray at central angle of view reflected on the surface 31b is returned and reflected with an angle of θ with respect to an incident ray on the surface 31c and re-reflected in a position lower than a point of the first reflection on the surface 31b.

In addition, the display optical system shown in FIG. 3 is different from the display optical system of first Embodiment in that a principal ray at central angle of view reflected on the surface 31b is returned and reflected with an angle of θ with respect to an incident ray on the surface 31c and re-reflected in a position higher than a point of the first reflection on the surface 31b.

In this way, a ray may be incident and reflected with a predetermined angle θ in front of and behind the return reflection surface 31c. However, the angle θ desirably satisfies the following condition:

|θ|<30°

It is not preferable that the angle θ deviates from this condition because the prism member 31 becomes large and it becomes difficult to make the entire optical system small.

In addition, the second optical system 20' can be miniaturized by making an optical path returned using a reflection surface as shown in FIG. 2. In this case, in order to correct an eccentric aberration caused by eccentrically arranging a surface having optical power, it is preferable to constitute at least one surface among optical surfaces constituting the second optical system 20' by an eccentric rotation asymmetrical surface.

In addition, in order to increase the number of optical surfaces contributing to the correction of an aberration, the second optical system may be constituted using two or more optical members including a reflection surface.

Moreover, as shown in FIG. 3, the second optical system 20" may be constituted only by a refraction surface. In particular, correction of a chromatic aberration becomes easy by using a concave lens 24, and further improvement of a focusing performance can be expected.

Further, correction of an eccentric aberration becomes easy by constituting the refraction surface by a free-form surface or an eccentric rotation symmetrical aspheric surface, and further improvement of a focusing performance can be expected.

THIRD EMBODIMENT

Figure 4:
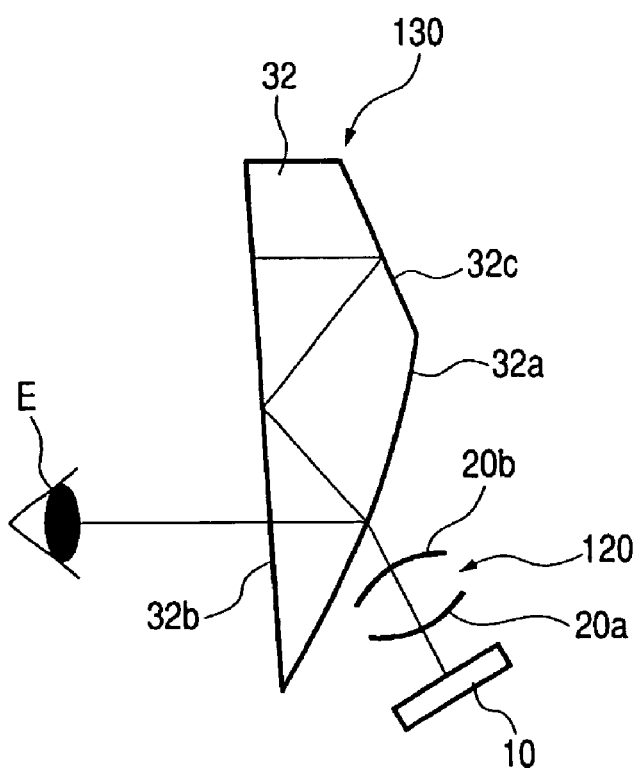
FIG. 4 is a diagram of a display optical system that is third Embodiment of the present invention.

FIG. 4 shows a display optical system that is third Embodiment of the present invention. For ease of understanding, a second optical system is simplified. A display optical system may be constituted by being combined with the second optical systems shown in FIGS. 1 to 3, respectively.

The display optical system of this embodiment is constituted by a first optical system 130 having positive optical power (1/focal length) as a whole and a second optical system 120 having positive optical power as a whole which are arranged in order from a side of an eye E of an observer toward an image display device (LCD, etc.) 10.

In this embodiment, the first optical system 130 is constituted with an optical surface formed on a transparent body (first optical element) 32 the inside of which is filled with an optical medium such as glass or plastics.

Light modulated and emitted by the image display device 10 is incident on the second optical system 120 from an incident surface 20a, exits the second optical system 120 from an exit surface 20b and is incident on the first optical element 32 from a surface 32a.

The light incident on the first optical element 32 from the incident surface 32a (third surface) is reflected on a surface 32b (first surface), reflected on a surface 32c (second surface), returned and reflected in the upper part of the surface 32b, re-reflected on the surface 32c, re-reflected on the surface 32b to a side opposite to a side at the last time the light was reflected with respect to a normal line of a surface on a hit point thereof, reflected on the surface 32a, transmitted through the surface 32b and exits the transparent body 32 to be guided to the eye E of the observer. Further, half mirror coating is applied to the surface 32a.

The first optical system 130 and the second optical system 120 are constituted to have positive optical power, whereby it becomes possible for the observer to visually recognize an enlarged image of an image displayed on the image display device 10.

In the first optical element 32, light passes through each surface in the order of the surface 32a→the surface 32b→the surface 32c→the surface 32b→the surface 32c→the surface 32b→the surface 32a (→the surface 32b), and with the reflection on the surface 32b as a boundary, follows the optical paths to that point in the reverse order.

In this way, since the forward and backward optical path is formed in the first optical system 130 with the surface 32b as the return reflection surface, in the same manner as first Embodiment, the first optical system 130 can be miniaturized with respect to an optical path length. Consequently, the entire display optical system including the second optical system 120 can be miniaturized.

In addition, an optical surface on the first optical element 32 is constituted by a rotation asymmetrical surface and an air layer (air space) is provided between the exit surface 20b of the second optical system 120 and the incident surface 32a of the first optical system 130, whereby improvement of an optical performance is realized as described in first Embodiment.

FOURTH EMBODIMENT

Figure 5:
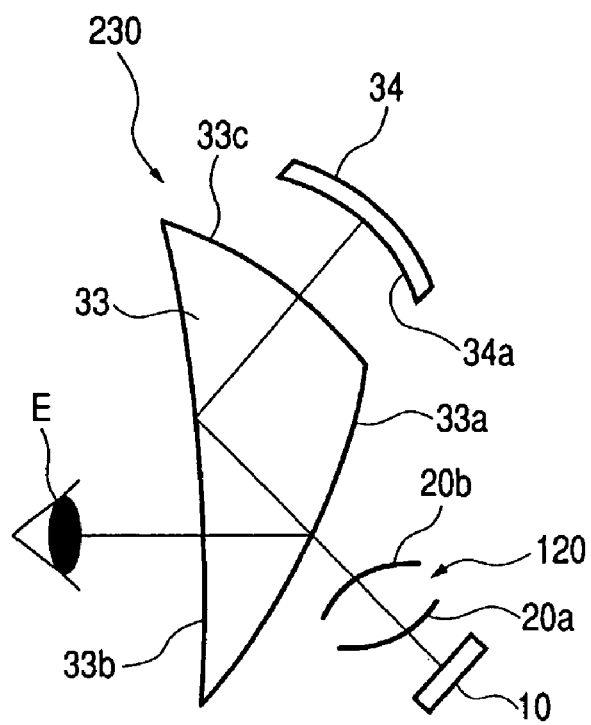
FIG. 5 is a diagram of an image taking optical system that is fourth Embodiment of the present invention.

FIG. 5 shows a display optical system that is fourth Embodiment of the present invention. For ease of understanding, a second optical system is simplified. A display optical system may be constituted by being combined with the second optical systems shown in FIGS. 1 to 3, respectively.

The display optical system of this embodiment is constituted by a first optical system 230 having positive optical power (1/focal length) as a whole and a second optical system 120 having positive optical power as a whole which are arranged in order from a side of an eye E of an observer toward an image display device (LCD, etc.) 10.

In this embodiment, the first optical system 230 is constituted of a transparent body (optical element) 33 the inside of which is filled with an optical medium such as glass or plastics and a reflection mirror member 34.

Light modulated and emitted by the image display device 10 is incident on the second optical system 120 from an incident surface 20a, exits the second optical system 120 from an exit surface 20b and is incident on the optical element 33 of the first optical system 230 from a surface 33a.

The light incident on the optical element 33 (first optical system 230) from the incident surface 33a (third surface) is reflected on a surface 33b (first surface), exits the optical element 33 from a surface 33c, is returned and reflected on a reflection surface 34a (second surface) of the reflection mirror member 34, incident on the optical element 33 from the surface 33c again, re-reflected on the surface 33b to a side opposite to a side at the last time the light was reflected with respect to a normal line of a surface on a hit point thereof, reflected on the surface 33a, transmitted through the surface 33b and exits the optical element 33 to be guided to the eye E of the observer. Further, half mirror coating is applied to the surface 33a.

The second optical system 120 is constituted to have positive optical power and at least one surface among optical surfaces constituting the first optical system 230 is formed as a curved surface to give positive optical power to the first optical system 230, whereby it becomes possible for the observer to visually recognize an enlarged image of an image displayed on the image display device 10.

In the first optical system 230, light passes through each surface in the order of the surface 33a→the surface 33b→the surface 33c→the surface 34a→the surface 33c→the surface 33b→the surface 33a (→the surface 33b), and with the reflection on the surface 34a as a boundary, follows the optical paths to that point in the reverse order.

In this way, since the forward and backward optical path is formed in the first optical system 230 with the surface 34a as the return reflection surface, in the same manner as first Embodiment, the first optical system 230 can be miniaturized with respect to an optical path length. Consequently, the entire display optical system including the second optical system 120 can be miniaturized.

In addition, an air layer (air space) is provided between the exit surface 20b of the second optical system 120 and the incident surface 33a of the first optical system 230, whereby improvement of an optical performance is realized as described in first Embodiment.

Moreover, in this embodiment, in the first optical system 230, the reflection mirror member 34 including the return reflection surface 34a is formed as a separate member from the transparent body 33, whereby the number of optical surfaces in an optical path is increased without affecting a size of the optical system, a degree of freedom of design is increased, and improvement of an optical performance is realized.

FIFTH EMBODIMENT

Figure 6:
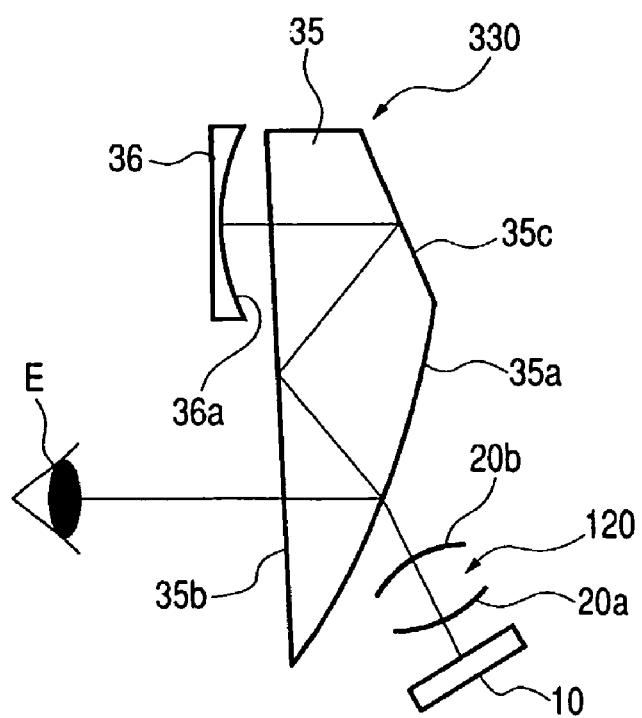
FIG. 6 is a diagram of a display optical system (1) that is fifth Embodiment of the present invention.

FIG. 6 shows a display optical system that is fifth Embodiment of the present invention. For ease of understanding, a second optical system is simplified. A display optical system may be constituted by being combined with the second optical systems shown in FIGS. 1 to 3, respectively.

The display optical system of this embodiment is constituted by a first optical system 330 having positive optical power (1/focal length) as a whole and a second optical system 120 having positive optical power as a whole which are arranged in order from a side of an eye E of an observer toward an image display device (LCD, etc.) 10.

In this embodiment, the first optical system 330 is constituted by a transparent body (optical element) 35 filled with an optical medium such as glass or plastics and a reflection mirror member 36.

Light modulated and emitted by the image display device 10 is incident on the second optical system 120 from an incident surface 20a, exits the second optical system 120 from an exit surface 20b and is incident on the optical element 35 of the first optical system 330 from a surface 35a.

The light beam incident on the optical element 35 (first optical system 330) from the incident surface 35a (third surface) is reflected on a surface 35b, reflected on a surface 35c (first surface), exits the optical element 35 from the surface 35b, is returned and reflected on a reflection surface 36a (second surface) of the reflection mirror member 36, is again incident on the optical element 35 from the surface 35b, re-reflected on the surface 35c, re-reflected on the surface 35b to a side opposite to a side at the last time the light was reflected with respect to a normal line of a surface on a hit point thereof, reflected on the surface 35a, transmitted through the surface 35b and exits the optical element 35 to be guided to the eye E of the observer. Further, half mirror coating is applied to the surface 35a.

The second optical system 120 is constituted to have positive optical power and at least one surface among optical surfaces constituting the first optical system 330 is formed as a curved surface to give positive optical power to the first optical system 330, whereby it becomes possible for the observer to visually recognize an enlarged image of an image displayed on the image display device 10.

In the first optical system 330, light passes through each surface in the order of the surface 35a→the surface 35b→the surface 35c→the surface 35b→the surface 36a→the surface 35b→the surface 35c→the surface 35b→the surface 35a (→the surface 35b), and with the return reflection on the surface 36a as a boundary, follows the optical paths to that point in the reverse order.

In this way, since the forward and backward optical path is formed in the first optical system 330 with the surface 36a as the return reflection surface, in the same manner as first Embodiment, the first optical system 330 can be miniaturized with respect to an optical path length. Consequently, the entire display optical system including the second optical system 120 can be miniaturized.

In addition, an air layer (air space) is provided between the exit surface 20b of the second optical system 120 and the incident surface 35a of the first optical system 330, whereby improvement of an optical performance is realized with the same reason described in first Embodiment.

Moreover, in this embodiment, in the first optical system 330, the reflection mirror member 36 including the return reflection surface 36a is formed as a separate member from the optical element 35, whereby the number of optical surfaces in an optical path is increased without affecting a size of the optical system, a degree of freedom of design is increased, and improvement of an optical performance is realized.

In fourth Embodiment (FIG. 5) and fifth Embodiment (FIG. 6) as described above, the reflection surfaces 34a and 36a of the reflection mirror members 34 and 36 are each desirably a curved surface from the viewpoint of increasing the number of focusing action surfaces. Moreover, these reflection surfaces 34a and 36a are formed in an eccentric rotation asymmetrical shape, whereby the reflection surfaces 34a and 36a are caused to contribute to correction of an eccentric aberration that occurs in the optical elements 33 and 35, and improvement of an optical performance can be realized.

Figure 7:
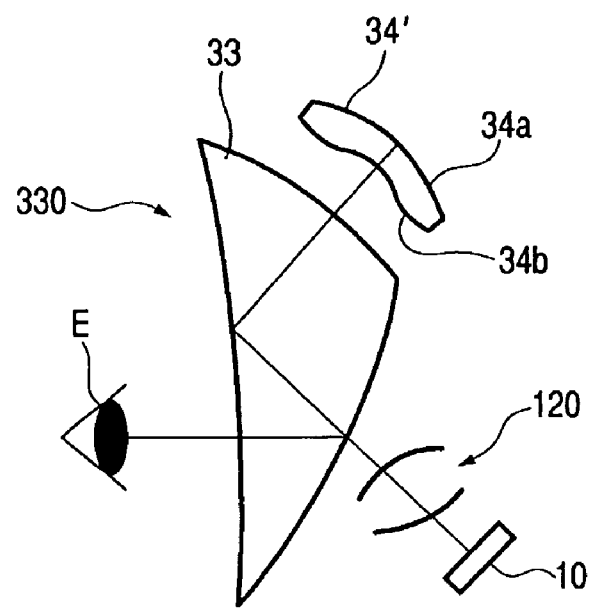
FIG. 7 is a diagram of a modification of the display optical system that is fourth Embodiment.

In addition, in fourth Embodiment, the reflection mirror member 34 is formed as a rear surface mirror as in a modification shown in FIG. 7, whereby not only the reflection surface 34a but also the transmission surface 34b can be used as an optical surface. Thus, a focusing performance can be further improved without affecting a size of the optical system.

Figure 8:
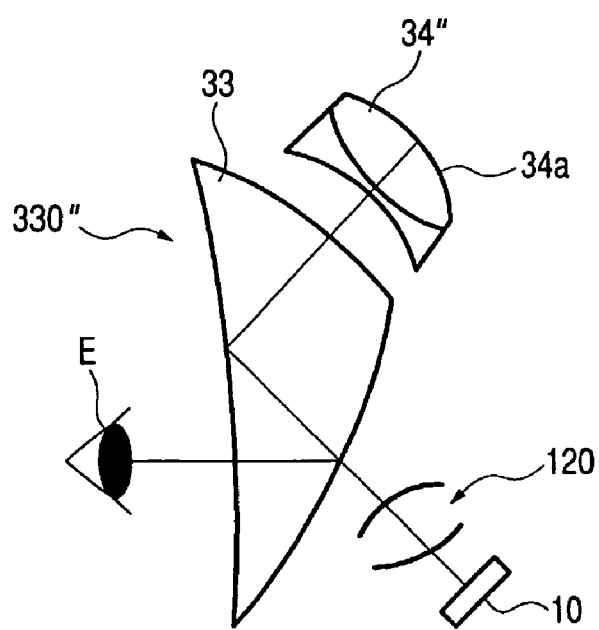
FIG. 8 is a diagram of a modification of the display optical system that is fourth Embodiment.

Further, as in a modification shown in FIG. 8, the reflection mirror member 34 is constituted by two or more optical elements, whereby correction of a chromatic aberration becomes easy and further improvement of a focusing performance can be realized.

The structure of the reflection mirror members 34' and 34" shown in FIGS. 7 and 8 can be applied to the reflection mirror member 36 used in fifth Embodiment.

In addition, in fourth Embodiment and fifth Embodiment, as in first Embodiment, in order to correct an eccentric aberration caused by eccentrically arranging a surface having optical power, it is preferable to constitute at least one surface among optical surfaces constituting the first optical systems 230 and 330 (optical elements 33 and 35) by a rotation asymmetrical surface.

In third, fourth, and fifth Embodiments described above, as in first Embodiment, an intermediate focusing surface in the display surface of the image display device 10 is formed in the optical path of the first optical system, whereby widening of an angle of view (display of an image at a high magnification) is made possible.

In addition, in the optical element of the first optical system, reflection on the optical surface having both transmitting action and reflecting action is made total reflection, whereby light can be effectively utilized.

Moreover, in third, fourth and fifth Embodiments, return reflection on a return reflection surface of a principal ray at central angle of view is not limited to vertical reflection, and a ray may be incident and reflected with a predetermined angle of θ in front of and behind the return reflection surface as shown in second Embodiment.

The display optical system is constituted as described in third, fourth and fifth Embodiments, whereby an image display apparatus can be provided which displays an image displayed on the image display device 10 as an enlarged image with a good optical performance.

In addition, a degree of freedom of setting a display angle of view with respect to a display size of the image display device 10 is improved by focusing light once in the display optical system to make it possible to set an angle of view wider (display an image at a high magnification). At the same time, the total length of the display optical system can be controlled to be short by duplicating optical paths, which become long along with widening of the angle of view, by forming a forward and backward optical path in the first optical system to constitute a very compact display optical system.

SIXTH EMBODIMENT

Figure 9:
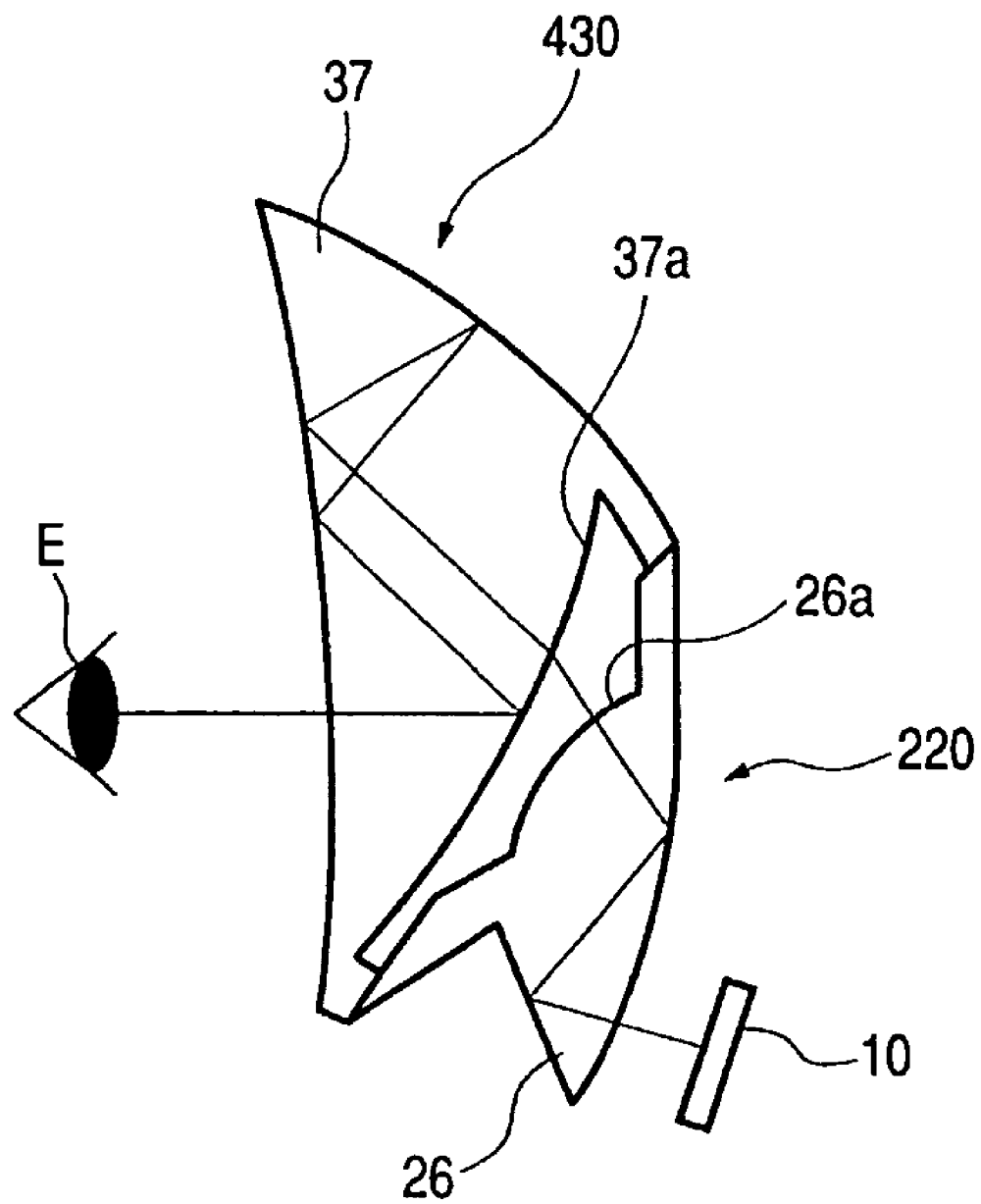
FIG. 9 is a diagram of a display optical system that is fifth Embodiment of the present invention.

FIG. 9 shows a display optical system that is sixth Embodiment of the present invention. The display optical system of this embodiment is constituted by a first optical system 430 having positive optical power (1/focal length) as a whole and a second optical system 220 having positive optical power as a whole which are arranged in order from a side of an eye E of an observer toward an image display device (LCD, etc.) 10.

In this embodiment, the first optical system 430 is constituted by a transparent body (first optical element) 37 the inside of which is filled with an optical medium such as glass or plastics, and. the second optical system 220 is also constituted by a transparent body (second optical element) 26 filled with the same optical medium. A travelling route of light in the first and second optical systems is the same as that shown in FIG. 2.

In this embodiment, an air layer (air space) is provided between an incident surface (third surface) 37a of the first optical element 37 and an exit surface 26a of the second optical element 26. However, the first optical element 37 and the second optical element 26 are configured so as to contact each other in parts other than the incident surface 37a of the first optical element 37 and the exit surface 26a of the second optical element 26 (outside an effective range of ray).

Consequently, a dimensional error (manufacturing error) of the air layer can be controlled to be small, and deterioration of an optical performance due to the manufacturing error can be prevented.

In addition, the same optical system as the display optical system of each of the above-described embodiments can be utilized as an image taking optical system that guides light from a subject to an image taking surface of a solid-state image taking device (photoelectric conversion device) such as a CCD or a CMOS.

For example, in the optical system shown in first Embodiment, light transmitted through the first surface (31b) and incident on the first optical system 30 (first optical element 31) from a subject is reflected on the third surface (31a), reflected on the first surface (31b), reflected on the second surface (31c), re-reflected on the first surface (31b) to a side opposite to a side at the last time the light was reflected with respect to a normal line of a surface on a hit point thereof, and transmitted through the third surface (31a) to be guided to the second optical system 20. Then, the light incident on the second optical system 20 from the surface 21c is reflected on the surface 21b and transmitted through the surface 21a to cause the light to reach an image taking device that is arranged in place of the image display device 10.

In this case, as in the display optical system, in the first optical system 30, light is caused to move generally back and forth among the first, second and third surfaces to return an optical path, whereby a long optical path can be secured despite the fact that the optical system is small. Consequently, a wide photographing angle of view can be attained despite the fact that the optical system is small.

Moreover, light is intermediately focused in the image taking optical system (e.g., the first optical element 31), that is, the image taking optical system is formed as an intermediate focusing type that reduces an intermediate focusing surface of a subject to guide an intermediate image to an image taking surface. Consequently, a degree of freedom of layout increases and a subject image of a wide angle of view can be sufficiently reduced to be guided to the image taking surface, and at the same time, the image taking optical system can be constituted to be small even if an optical path is relatively long.

Further, advantages realized by causing the optical surface constituting the image taking optical system to be eccentric with respect to light, giving a curvature to the optical surface or making the optical surface a rotation asymmetrical surface (free-form surface) are the same as those in the display optical system.

SEVENTH EMBODIMENT

Figure 10:
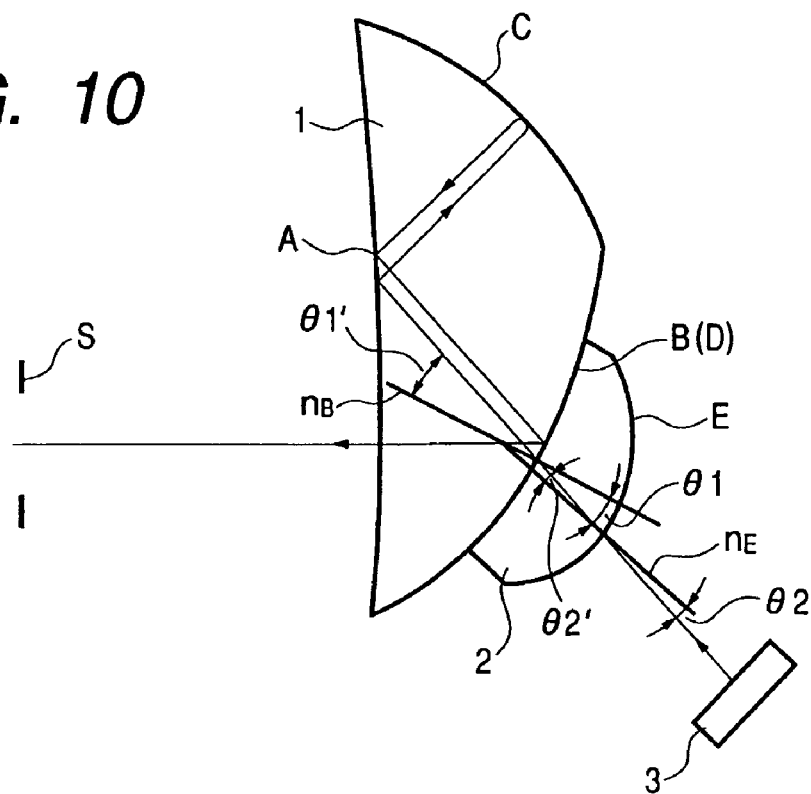
FIG. 10 is a diagram of a display optical system that is sixth Embodiment of the present invention.

FIG. 10 shows a display optical system that is seventh Embodiment of the present invention. This display optical system is constituted by a first optical element 1 and a second optical element 2.

The first optical element 1 consists of a prism-like transparent body with three optical surfaces of a surface A, a surface B and a surface C formed on a medium with an index of refraction of n1 such as glass or plastics. In addition, the second optical element 2 consists of a lens-like transparent body with two optical surfaces of a surface D and a surface E formed on a medium with an index of refraction of n2. Reference numeral 3 denotes an image display device, for which an LCD or the like of a transmission type or a reflection type is used.

In the first optical element 1, both the surface A (first surface) and the surface B (third surface) are surfaces used for both transmission action and reflection action as a transmission surface and a reflection surface, and the surface C (second surface) is a reflection surface.

In addition, in the second optical element 2, both the surface D and the surface E are transmission surfaces. In this embodiment, the surface B of the first optical element 1 and the surface D of the second optical element 2 are joined, and the first optical element 1 and the second optical element 2 are integrated.

A reflective film is formed on the surface C, and a semi-transmission reflective film (half mirror) is formed on at least one of the surface B and the surface D.

Further, the reflective film and the half mirror are preferably made of a metal film. This is because the metal film has a flat spectral reflectance characteristic and an inconspicuous color and has little difference of reflectance with respect to light having different polarization directions.

In addition, a reflective film, semi-transmission reflective film formation or total internal reflection is utilized to cause a part (upper part) of the surface A to act as a reflection surface.

With such a structure, the surface B functions as the incident surface and the reflection surface of the first optical element 1, the surface C functions as the reflection surface of the first optical element 1, and the surface A functions as the reflection surface and the exit surface of the first optical element 1. In addition, the surface E functions as the incident surface of the second optical element 2, and the surface D functions as the exit surface of the second optical element 2.

In addition, both the transparent bodies of the first and second optical elements 1, 2 have refracting power, and have at least one optical surface having a curvature, respectively.

Light modulated and emitted by the image display device 3 from the image display surface is incident on the second optical element 2 from the surface E of the second optical element 2 and exits the second optical element 2 from the surface D that is joined with the surface B that is the incident surface of the first optical element 1.

The light is transmitted through the surface B, incident on the first optical element 1 and reflected on the surface A to be guided to the surface C. The light reflected on the surface A is reflected on the surface C so as to return in substantially the opposite direction with respect to the incident direction. Consequently, the light is returned to the vicinity of the first reflection area of the light on the surface A and reflected again and, after being reflected on the half mirror joined surface B, transmitted through the surface A and exits the first optical element 1 to reach the exit pupil S.

In this embodiment, the observer places an eye in the vicinity of the position of the exit pupil S, whereby an enlarged image of an image displayed on the image display device 3 is visually recognized by the observer who has an incident direction of a principal ray at central angle of view on the pupil as a visual axis direction.

Further, FIG. 10 shows a principal ray at central angle of view, which exits a center of an image display surface of the image display device 3 to reach a center of the exit pupil S, as light emitted from the image display device 3. An optical sectional view in a plane formed by the principal ray at central angle of view is shown.

In the first optical element 1, the light passes through each surface in the order of the surface B→the surface A→the surface C→the surface A→the surface B (→the surface A), and follows an optical path to that point with reflection on the surface C as a boundary.

Here, the optical path of the surface B→the surface A→the surface C is referred to as a forward path and the optical path of the surface C→the surface A→the surface B is referred to as a backward path. The forward path and the backward path are collectively referred to as a forward and backward optical path. Reflecting the light from the forward path to the backward path in substantially the opposite direction in order to form such a forward and backward optical path is referred to as return reflection. In addition, a reflection surface (surface C in this context) that corresponds to a returning point of the forward path and the backward path and has a return reflecting action is referred to as a return reflection surface.

In this way, with the surface C as the return reflection surface, the forward and backward optical path is formed in the first optical element 1 to return an optical path so as to duplicate, a space in the first optical element 1 is effectively utilized and a size of the first optical element 1 can be reduced with respect to an optical path length. Consequently, the entire display optical system including the second optical element 2 is miniaturized.

That is, in this embodiment, the forward path that is the optical path before light reaches the return reflection surface C in the first optical element 1 and the backward path that is the optical path after the light is reflected on the return reflection surface C are shared by the two surfaces A and B. These two surfaces are used in the forward path and the backward path in the opposite orders to form the forward and backward optical path.

In this way, at least two surfaces are used before and after the return reflection on the surface C to form the forward and backward optical path and increase a degree of duplication of optical paths. Consequently, even if an optical system has a long optical path length, a compact optical system with the entire length thereof controlled to be short is realized.

Figure 11:
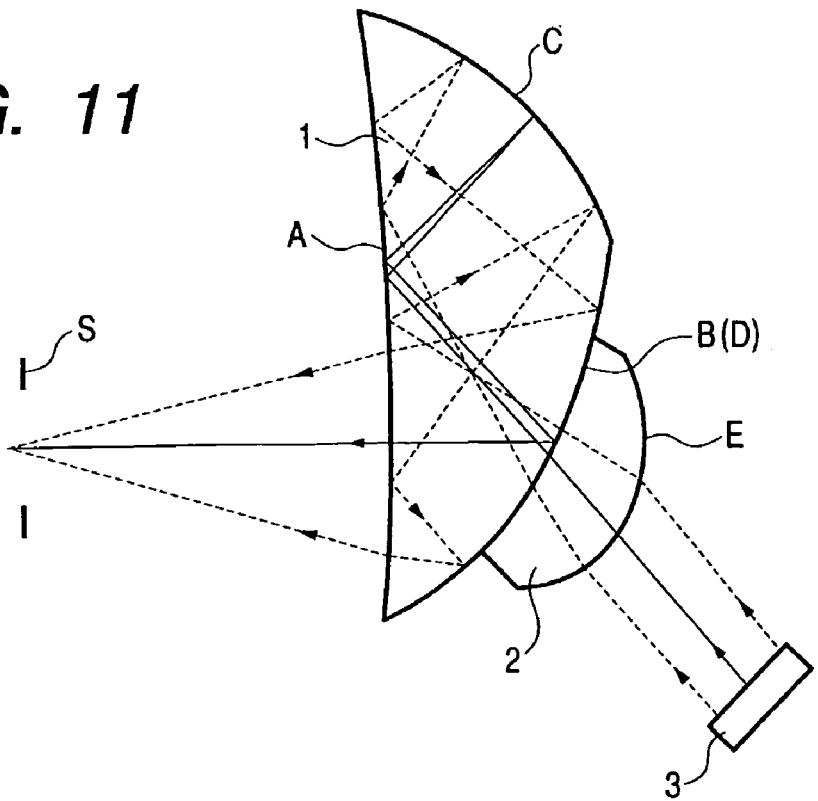
FIG. 11 is an optical path diagram of a principal ray at maximum angle of view in the display optical system of FIG. 10.
Figure 12:
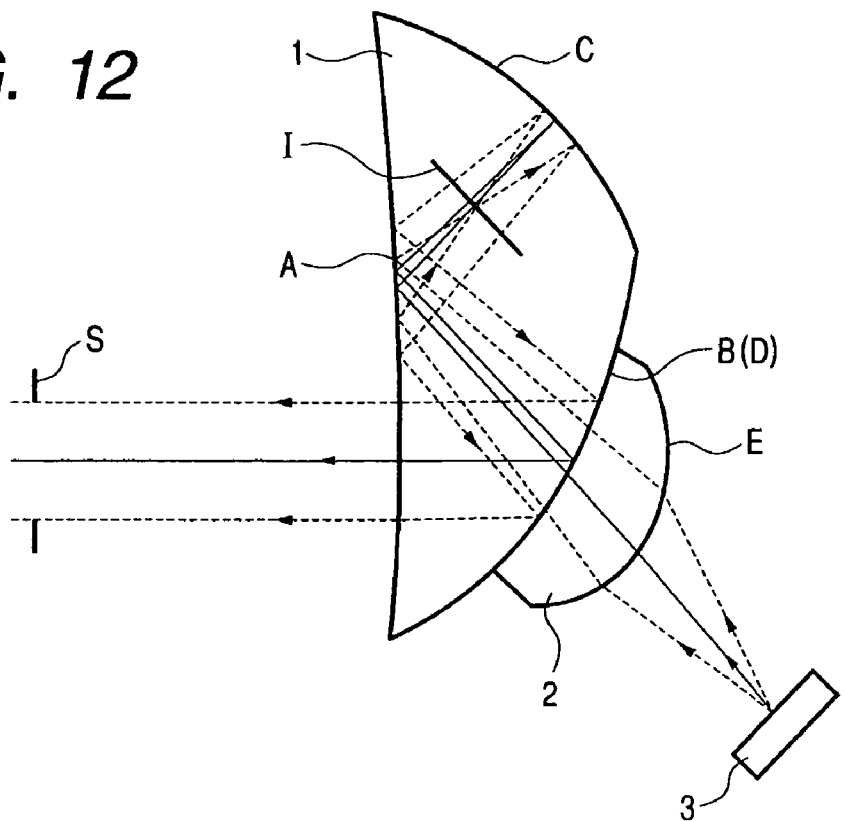
FIG. 12 is an optical path diagram of a ray exiting from the center of an image display surface in the display optical system of FIG. 10.

FIGS. 11 and 12 are diagrams showing a principal ray at maximum angle of view and marginal rays at central angle of view on the same section as FIG. 10 in this embodiment, respectively.

As indicated by dotted lines in FIG. 11, rays emitted from the ends of the image display surface of the image display device 3 to reach the center of the exit pupil S (principal rays at maximum angle of view) are guided to the first optical element 1 through the second optical system 2 and to the center of the exit pupil S passing through the surfaces in the order of the surface B (incidence)→the surface A (reflection)→the surface C (return reflection)→the surface A (reflection)→the surface B (reflection)→the surface A (exit) in the same manner as the principal ray at central angle of view is guided.

As indicated by chain lines in FIG. 12, rays emitted from the center of the image display surface of the image display device 3 to reach the ends of the exit pupil S (marginal rays) are guided to the first optical element 1 through the second optical element 2 and to the ends of the exit pupil S passing through the surfaces in the order of the surface B (incidence)→the surface A (reflection)→the surface C (return reflection)→the surface A (reflection)→the surface B (reflection)→the surface A (exit) in the same manner as the principal ray at central angle of view is guided.

In this case, the marginal rays intersect in the first optical element 1, and an intermediate image of an image displayed on the image display device 3 is formed in the vicinity of an intermediate focusing surface I shown in the figure.

In this way, the intermediate image is formed in the first optical element 1, whereby the optical system can be constituted compactly without extremely increasing power of the second optical element 2, occurrence of an excessive aberration in the second optical element 2 can be controlled, and complication of the second optical element 2 can be prevented.

In FIG. 12, the intermediate image is formed between the reflection on the surface A and the return reflection on the surface C. However, the intermediate image is not always required to be in this position but may be formed within the first optical element 1.

In this embodiment, a relay optical system is formed by the refraction on the surface E of the second optical element 2, the refraction on the joined surface of the surface D of the second optical element 2 and the surface B of the first optical element 1, and the reflection on the surface A. In addition, an ocular optical system is formed by the return reflection on the surface C, the re-reflection on the surface A, the reflection on the surface B and the refraction on the surface A.

In order to facilitate correction of an aberration in the ocular optical system, the intermediate focusing surface may be formed so as to be appropriately curved or have an astigmatic difference depending on a situation in which a curvature of field or an astigmatism occurs in the ocular optical system.

In addition, the surfaces A and B of the first optical element 1 are made aslant with respect to a reflected light beam when an effective light beam finally guided to the exit pupil S is reflected on respective surfaces. Both the optical path of the surface B (incidence)→the surface A (reflection)→the surface C that is the forward path to the surface C as the return reflection surface and the optical path of the surface C→the surface A (reflection)→the surface B (reflection)→the surface A (exit) that is the backward path after the surface C are constituted to be returned to make the first optical element 1 thin.

In the above-described structure, the two surfaces including at least the surface B are preferably formed of a curved surface in the first optical element 1. Consequently, the number of surfaces that do not contribute to focusing or correction of an aberration can be reduced, the number of optical surfaces necessary for the entire optical system can be reduced, and an effect of reduction of manufacturing costs can be expected.

More desirably, the surfaces A, B and C are formed of a curved surface, respectively, whereby an effect of further reduction of manufacturing costs is realized. Similarly, the optical surfaces D and E of the second optical element 2 are preferably formed of a curved surface, respectively.

In addition, in this embodiment, the surface B is a curved surface consisting of at least one surface of the first optical element, and the surface B, when it acts as a final reflection surface, is made a concave surface mirror having very strong optical power. Moreover, the surface B is made a reflection surface with an extremely high degree of eccentricity with respect to a ray after being returned and reflected on the surface C.

That is, an eccentric aberration occurs on the concave mirror surface B. Therefore, it is desirable to use a rotation asymmetrical surface (so-called free-form surface) on at lest one surface of the first optical element 1 to correct the occurrence of an eccentric aberration.

In particular, since the surface B is a curved surface with strong optical power compared with the surface A, it is preferable to form the surface B in a rotation asymmetrical shape to control the occurrence of an eccentric aberration. Therefore, the surface D of the second optical element 2 that is a joined surface with the surface B is also formed in a rotation asymmetrical shape.

More preferably, all the three surfaces A, B and C constituting the first optical element 1 are formed in a rotation asymmetrical shape, whereby a degree of freedom of correction of an eccentric aberration increases and it becomes possible to display an image with a good image quality.

More desirably, both the surfaces D and E constituting the second optical element 2 are also made rotation asymmetrical surfaces.

In this case, it is preferable to form each rotation asymmetrical surface in a shape that is plane symmetrical in a vertical direction in a paper surface of the figure having a cross section of the paper surface of the figure as an only symmetrical surface because processing and manufacturing can be easily performed compared with the case without symmetricalness.

In addition, it is preferable to make the reflection on the surface A total reflection in the first optical element 1 because a loss in an amount of light is reduced. Further, at least in an area shared by a reflected light beam and an exiting light beam on the surface A, if a reflected light beam is totally reflected, the same degree of brightness can be secured while increasing a degree of freedom of design compared with the case in which all reflected light beams are totally reflected.

In this case, a reflective film is formed in an area in which a reflected light beam on the surface A is not totally reflected. It is preferable to form the vicinity of a boundary area between a total reflection part and a reflection part by the reflective film as a gradation reflective film in which reflectance decreases as the area is closer to the total reflection area. This is because a phenomenon in which the boundary area is conspicuous due to diffusion in the boundary area or a difference of reflectance between the total reflection and the reflection by the reflective film can be controlled.

In addition, as described above, since the surface B is an eccentric curved surface that is eccentric with respect to the principal ray at central angle of view and has a strong condensing action, an eccentric aberration (rotation asymmetrical aberration) also occurs when the surface B is used as a refraction surface.

Thus, it is preferable to join the first optical element 1 with an index of refraction of n1 (>1) and the second optical element 2 with an index of refraction of n2 (>1) and give them an effect of decreasing occurrence of an eccentric aberration at the time of refractive transmission on the surface B (at the time of incidence of light on the first optical element 1).

More specifically, it is necessary to set an absolute value of a difference between n1 and n2, that is, |n1-n2|, to be smaller than n1-1 and n2-1. More preferably, occurrence of an eccentric aberration at the time of transmission can be prevented by making n1 and n2 equal.

In FIG. 10, reference symbols nE and nB denote a normal line at a hit point of a principal ray at central angle of view of the surface E and a normal line at a hit point of a principal ray at central angle of view of the surface B, respectively. It is preferable to slant the surface E with respect to the surface B (surface D) such that an incident angle θ2 of the principal ray at central angle of view on the incident surface E of the second optical element 2 of and an exit angle θ2' therefrom become smaller than an incident angle θ1 on an incident surface B of the first optical element 1 and an exit angle θ1' therefrom. This is because an eccentric aberration that occurs when light is incident on the second optical element 2 can be controlled to be small.

By constituting the display optical system as described above, an image display apparatus can be provided which displays an image displayed on the image display device 3 as an enlarged image with a good optical performance.

In addition, a degree of freedom of design is improved by focusing light once in the display optical system to make it possible to set an angle of view of a display angle of view wider (display an image at a high magnification) with respect to a display size of the image display device 3. At the same time, the total length of the first optical element 1 can be controlled to be short by duplicating optical paths, which become long along with the widening of the angle of view, by forming a forward and backward optical path in the first optical element 1 to constitute a very compact display optical system.

Moreover, the first optical element 1 and the second optical element 2 are joined, whereby positioning of both the optical elements 1 and 2 is facilitated, occurrence of an eccentric aberration at the time of incidence of light on the first optical element 1 is controlled and, at the same time, a strong optical system structure is obtained. Thus, it becomes possible to realize an optical system that is high in an optical performance and excellent in durability.

EIGHTH EMBODIMENT

Figure 13:
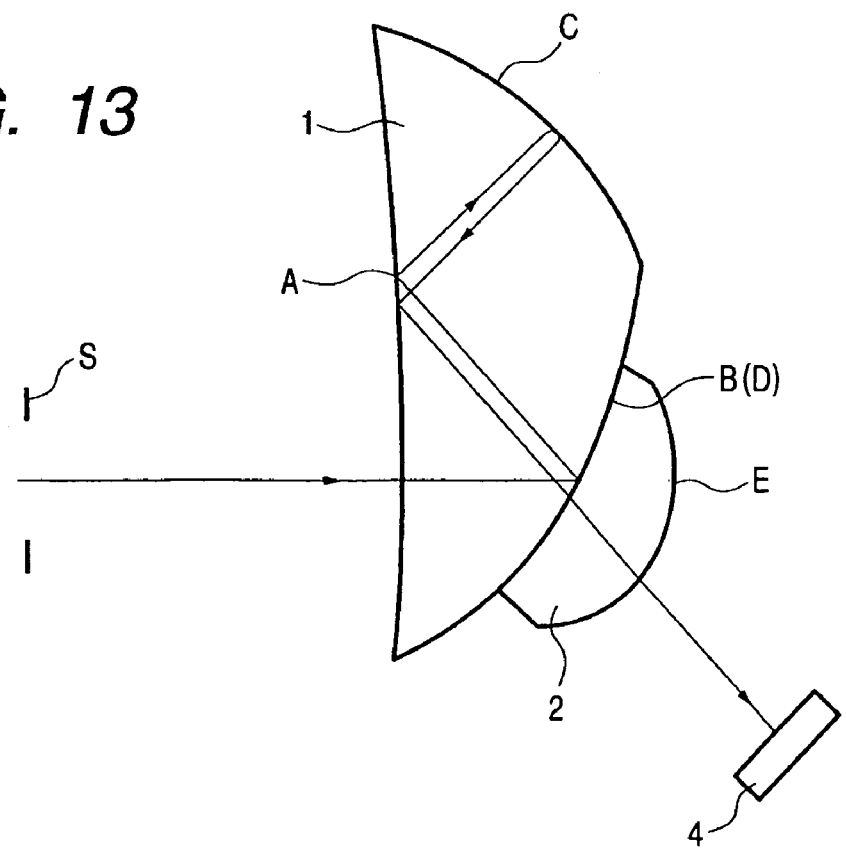
FIG. 13 is a diagram of an image taking optical system that is seventh Embodiment of the present invention.

FIG. 13 shows a structure of an image taking optical system that is eighth Embodiment of the present invention. This image taking optical system is constituted by the first optical element 1 and the second optical element 2 as in the display optical system of seventh Embodiment. Reference numeral 4 denotes an image taking device such as a CCD. Reference symbol S denotes an entrance pupil of the image taking optical system consisting of the first optical element 1 and the second optical element 2. The stop is placed in this position to prevent incidence of unnecessary light.

In this embodiment, a surface A (first surface) acts as an incident surface and a reflection surface of the first optical element 1, a surface B (third surface) acts as a reflection surface and an exit surface of the first optical element 1, and a surface C (second surface) acts only as a reflection surface of the first optical element 1.

In addition, a surface D acts as an incident surface of the second optical element 2 and a surface E acts as an exit surface of the second optical element 2. Further, the surface B acting both as the reflection surface and the exit surface of the first optical element 1 and the incident surface D of the second optical element 2 are joined after a semi-transmission reflective film (half mirror) is formed on at least one of the surfaces.

Light from a subject that has passed through the stop S is incident on the first optical element 1 from the surface A, reflected on the surface B and reflected on the surface A to be guided to the surface C. Then, the light is returned and reflected on the surface C to be returned to a first reflection area of light on the surface A, re-reflected on the surface A and transmitted through the surface B to exit the first optical element 1. Here, the surface A and the surface B are eccentric with respect to a ray forming a reflected light beam on each surface.

The light that has exit the first optical element 1 passes through the second optical element 2 to reach the image taking device 4. In this case, light from a desired outside (subject) is focused on an image taking surface of the image taking device 4, whereby an outside image can be taken.

By constituting the image taking optical system as described above, an image taking apparatus can be provided which focuses an image of a subject on the image taking device 4 with a good optical performance.

In addition, light is focused once in the first optical element 1 to make it possible to set an image taking angle of view wider with respect to a size of the image taking device 4. At the same time, an optical path, which becomes long along with the widening of the angle of view, is returned so as to duplicate by forming a forward and backward optical path in the first optical system 1 to control the total length of the first optical system 1 to be short to thereby constitute a very compact image taking optical system.

Moreover, the first optical element 1 and the second optical element 2 are joined, whereby positioning of both the optical elements 1 and 2 is facilitated, occurrence of an eccentric aberration at the time of exit of light from the first optical element 1 is controlled and, at the same time, a strong optical system structure is obtained. Thus, it becomes possible to realize an optical system that is high in an optical performance and excellent in durability.

Further, seventh and eighth Embodiments as described above, return reflection of a principal ray at central angle of view (in the display optical system, a ray reaching the center of the exit pupil S from the center of a display surface of an image display device and, in the image taking optical system, a ray passing through the center of the entrance pupil to reach the center of an image taking surface of an image taking device) on the surface C is depicted as if it is substantially vertical reflection. However, the optical system of the present invention is not limited to this configuration.

NINTH EMBODIMENT

Figure 14:
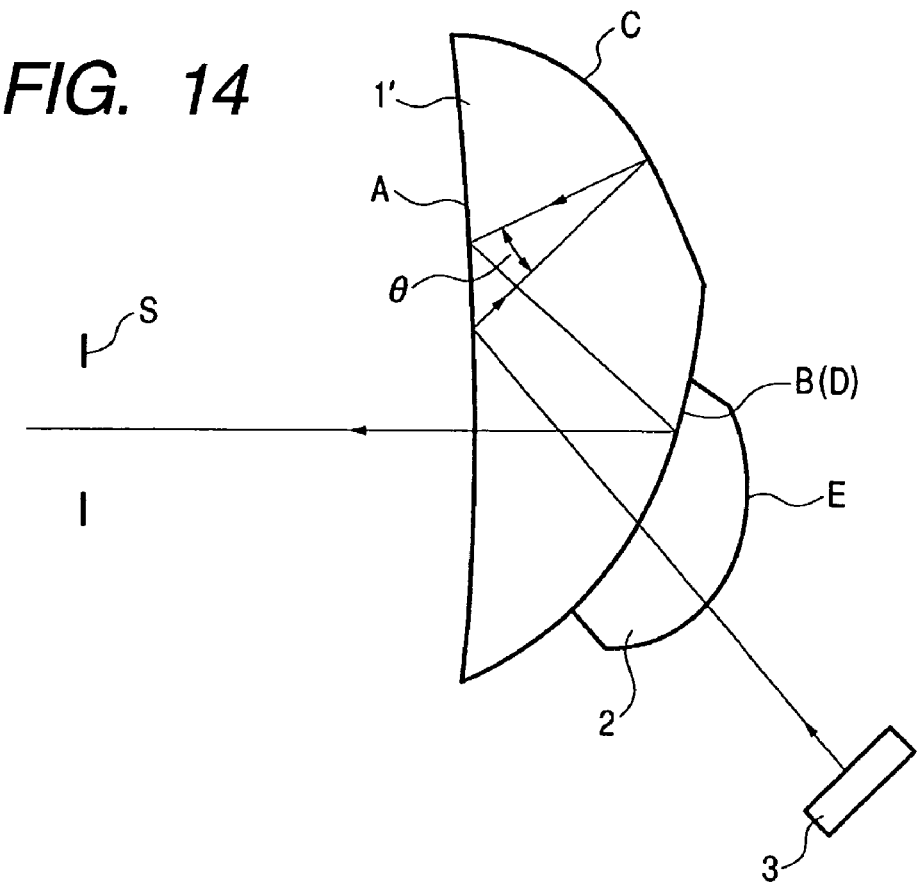
FIG. 14 is a diagram of a display optical system (1) that is eighth Embodiment of the present invention.
Figure 15:
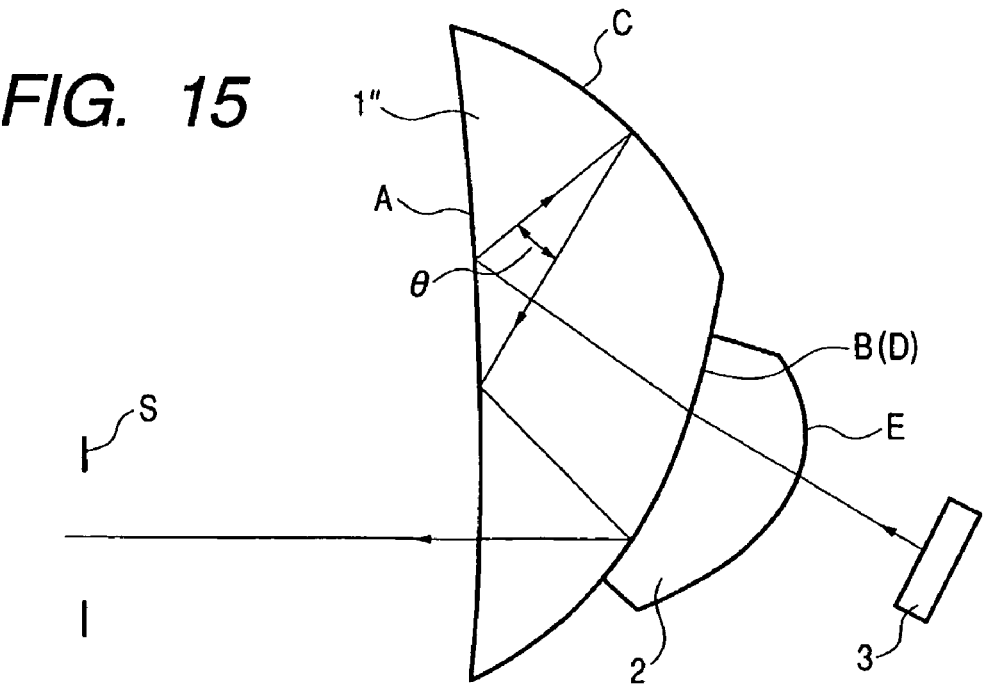
FIG. 15 is a diagram of a display optical system (2) that is eighth Embodiment of the present invention.

FIGS. 14 and 15 show display optical systems that are ninth Embodiment of the present invention. These display optical systems are examples in which first optical elements 1' and 1" that are different from the first optical element 1 in seventh Embodiment are used.

The display optical systems of ninth Embodiment shown in FIGS. 14 and 15 are the same as the first optical element 1 of seventh Embodiment in that an optical path of the surface B (incidence), the surface A (reflection)→the surface C (return reflection)→the surface A (reflection)→the surface B (reflection)→the surface A (exit) is formed.

However, the first optical element 1' of FIG. 14 is different from the first optical element 1 of seventh Embodiment in that a principal ray at central angle of view reflected on the surface A is returned and reflected with an angle of θ on the surface C and re-reflected in a position higher than a first point of reflection on the surface A (provided that it is an area close to the first reflection area of the ray).

In addition, the first optical element 1" of FIG. 15 is different from the first optical element 1 of seventh Embodiment in that a principal ray at central angle of view reflected on the surface A is returned and reflected with an angle of θ on the surface C and re-reflected in a position lower than a point of the first reflection on the surface A (provided that it is an area close to the first reflection area of the ray).

In this way, a ray may be incident and reflected with a predetermined angle θ in front of and behind the return reflection surface C. However, the angle θ desirably satisfies the following condition:

$$|\theta| < 30°$$

It is not preferable if the angle θ deviates from this condition because the first optical system becomes large and it becomes difficult to make the entire display optical system small.

Further, although the display optical system having the first optical system is described in this embodiment, the same idea as this embodiment can be applied to the image taking optical system as shown in eighth Embodiment. That is, a ray may be incident and reflected with a predetermined angle θ (|θ|<30°) before and after return reflection on the return reflection surface C.

TENTH EMBODIMENT

Figure 16:
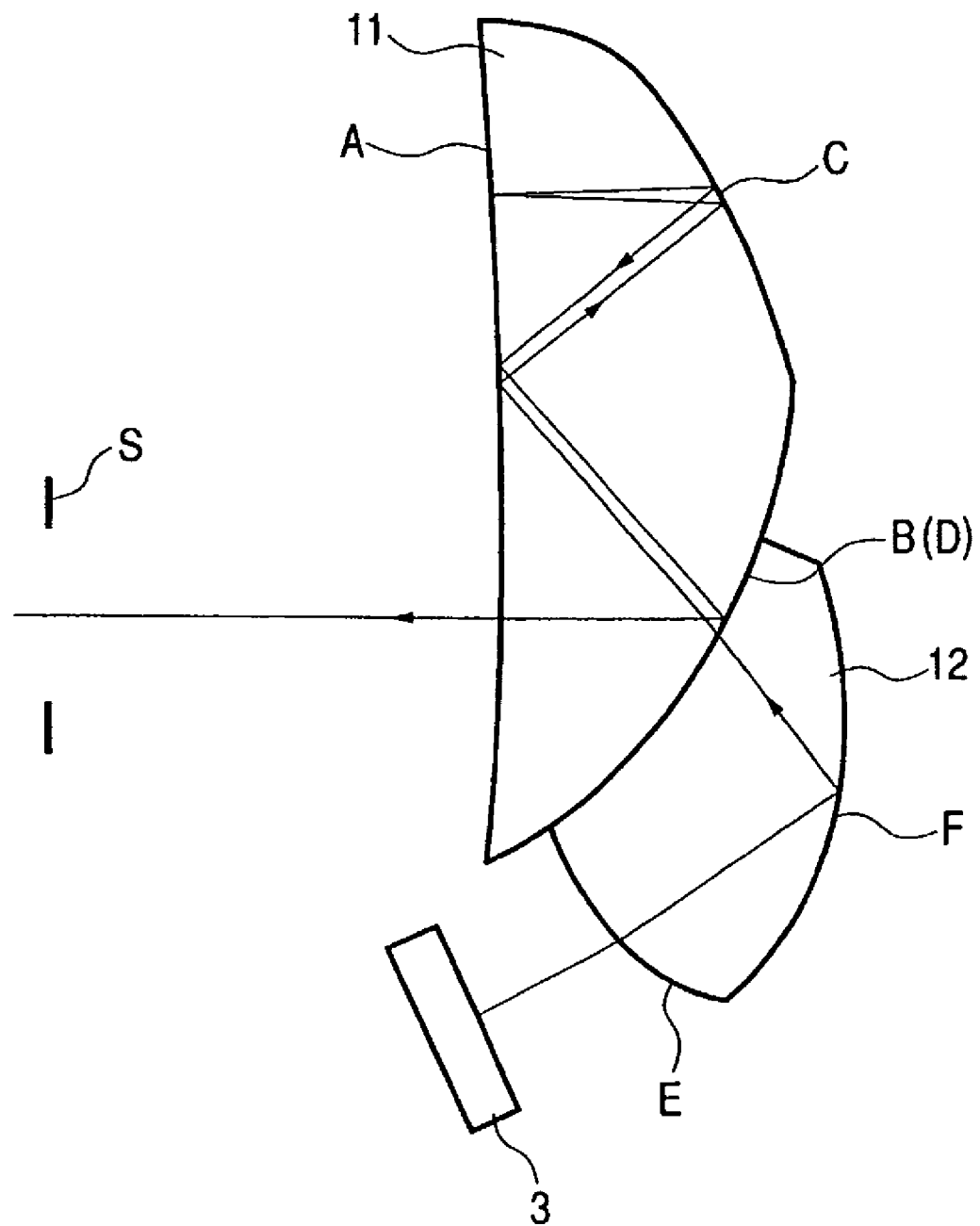
FIG. 16 is a diagram of a display optical system that is ninth Embodiment of the present invention.

FIG. 16 shows a structure of a display optical system that is tenth Embodiment of the present invention. This display optical system is constituted by a first optical element 11 and a second optical element 12. Reference numeral 3 denotes an image display device, for which an LCD or the like of a transmission type or a reflection type is used.

The first optical element 11 consists of a prism-like transparent body with three optical surfaces of a surface A, a surface B and a surface C formed on a medium having an index of refraction of n1 in the same manner as the first optical element 1 of seventh Embodiment. Both the surface A and the surface B are surfaces for transmission and reflection that act as a transmission surface and a reflection surface, and the surface C is a reflection surface. However, as described in detail later, in this embodiment, the surface A is a surface having both the functions of the first surface and the second surface. The surface B is the third surface as in seventh Embodiment.

In addition, a reflective film is formed on the surface C, and a semi-transmission film is formed on the surface B. Moreover, in this embodiment, a reflective film is formed in a part (upper part) of the surface A.

On the other hand, the second optical element 12 consists of a prism-like transparent body with three optical surfaces of a surface D, a surface E and a surface F formed on a medium an index of refraction of n2. Both the surface D and the surface E are surfaces acting as a transmission surface, and the surface F is a surface acting as a reflection surface. A reflective film is formed on the surface F.

In this embodiment, the surface E functions as an incident surface of the second optical element 12, the surface F functions as a reflection surface of the second optical element 12, and the surface D functions as an exit surface of the second optical element 12. In addition, the surface B functions as an incident surface and a reflection surface of the first optical element 11, the surface C functions as a reflection surface of the first optical element 11, and the surface A functions as a reflection surface and an exit surface of the first optical element 11.

Light modulated and emitted by the image display device 3 is incident on the second optical element 12 from the surface E, and after being reflected on the surface F, exits from the surface D joined with the surface B of the first optical element 11 to be guided to the first optical element 11.

The light is transmitted through the surface B to be incident on the first optical element 11 and after being reflected on the surface A, reflected on the surface C to be guided to the upper part of the surface A. The light guided to the surface A is reflected on the surface A substantially vertically (return reflection: second reflection), reflected again on the surface C, returned to a first reflection area of light on the surface A and re-reflected (third reflection) so as to travel back on a reversed route of the route on which the light has traveled in the first optical element 11, and reflected on the surface B, transmitted through the surface A and exits the first optical element 11 to reach the exit pupil S.

An observer can visually recognize an enlarged image of an image displayed on the image display device 3 by placing an eye in the vicinity of the position of the exit pupil S.

Further, as an example of light emitted from the image display device 3, a principal ray at central angle of view that exits the center of the display surface of the image display device 3 and reaches the center of the exit pupil S is shown in FIG. 16. An optical sectional view formed by the principal ray at central angle of view is shown in the figure.

In addition, in at least the first and third reflections among the three reflections on the surface A, the reflection on the surface B and the reflection on the surface C, these surfaces are arranged to act as eccentric reflection surfaces that are eccentric with respect to an arbitrary ray forming an effective light beam emitted from the image display device 3 to reach the exit pupil S. Consequently, the optical path is returned in the first optical element 1 to form the first optical element 11 thin.

In this embodiment, light passes through each surface in the order of the surface B (transmission)→the surface A (reflection)→the surface C (reflection)→the surface A (return reflection)→the surface C (re-reflection)→the surface A (re-reflection)→the surface B (reflection) (→the surface A (transmission)) in the first optical element 11 and, with the return reflection on the surface A as a boundary, follows the optical paths to that point in the reverse order until the light reaches the final reflection surface B.

That is, in this embodiment, the optical path before reaching the return reflection surface A in the first optical element 11 and the optical path after being reflected on the return reflection surface A duplicate on the three surfaces A, B and C in the reverse orders to form a forward and backward optical path.

In this way, the three surfaces are used before and after the reflection on the return reflection surface A to form the forward and backward optical path to further increase a degree of duplication of optical paths compared with seventh Embodiment. Consequently, a compact optical system with the total length of the first optical element controlled to be shorter can be realized.

In addition, in this embodiment, the reflection surface F is provided in the second optical element 12. Consequently, a degree of freedom of optical path formation is increased to make the entire optical system thinner compared with seventh Embodiment and, at the same time, the number of optical action surfaces is increased to weaken optical power assumed by each surface in the second optical element 12 and control occurrence of an aberration.

In this embodiment, occurrence of excessive aberrations can also be controlled by forming an intermediate image in the first optical element 11. The intermediate image may be focused so as to be appropriately curved or have an astigmatic difference depending on a situation in which a curvature of field or an astigmatism occurs in the ocular optical system part.

In addition, at least the surfaces B and C of the first optical element 11 are made curved surfaces to reduce the number of surfaces that do not contribute to focusing or correction of an aberration and reduce the number of surfaces necessary for the optical system.

Moreover, the surfaces A, B and C are formed of a curved surface, respectively, whereby an optical element in which the number of surfaces that do not contribute to focusing or correction of an aberration is further reduced can be obtained. Consequently, an effect of cost reduction can also be expected. Similarly, it is preferable to form the optical surfaces D, E and F of the second optical element 12 as a curved surface, respectively, as well.

In addition, it is preferable to form the surface B in a rotation asymmetrical shape to control occurrence of an eccentric aberration. Therefore, the surface D that is a joined surface with the surface B is also formed in a rotation asymmetrical shape.

More preferably, all of the three surfaces A, B and C constituting the first optical element 11 are formed in a rotation asymmetrical shape, whereby a degree of freedom of correction of an eccentric aberration increases and it becomes possible to display an image with a high quality.

More desirably, the surfaces D, E and F constituting the second optical element 12 are formed in a rotation asymmetrical shape as well. In this case, it is preferable to form each rotation asymmetrical surface in a shape that is plane symmetrical in a vertical direction in a paper surface of the figure having a cross section of the paper surface of the figure as an only symmetrical surface because processing and manufacturing can be easily performed compared with the case without symmetricalness.

In addition, concerning reflections other than the return reflection on the surface A, it is preferable to make the reflection on the surface A total reflection in the first optical element 11 because a loss in an amount of light is reduced. Further, at least in an area shared by (common for both) a reflected light beam and an exiting light beam on the surface A (lower part of the surface A), if a reflected light beam is totally reflected, the same degree of brightness can be secured while increasing a degree of freedom of design compared with the case in which all reflected light beams other than the return reflection on the surface A are totally reflected.

In addition, as in ninth Embodiment above, a ray may be made incident and reflected with a predetermined angle θ in front of and behind the return reflection surface A. However, the angle θ desirably satisfies the following condition:

$|\theta|<30°$

It is not preferable if the angle θ deviates from this condition because the first optical element 11 becomes large and it becomes difficult to make the entire display optical system small.

By constituting the display optical system as described above, an image display apparatus can be provided which displays an image displayed on the image display device 3 as an enlarged image with a good optical performance.

In addition, a degree of freedom of design is improved by focusing light once in the display optical system to make it possible to set an angle of view of a display angle of view wider (display an image at a high magnification) with respect to a display size of the image display device 3. At the same time, the total length of the first optical element 11 can be controlled to be short by duplicating long optical paths by forming a forward and backward optical path in the first optical element 11 to constitute a very compact display optical system.

Further, the optical system described in this embodiment can be used as an image taking optical system by reversing the optical path and arranging an image taking device in stead of the image display device.

In addition, the number of surfaces, shapes and combinations of the first optical element and the second optical element shown in each embodiment described above are not specifically limited to these.

Further, in all the embodiments described above, when an arbitrary ray of a light beam passing through the first optical system is traced, in the first reflection and the second reflection on the first surface, the ray takes an optical path in which the ray is reflected at an angle of reflection of an opposite sign in one reflection with the other angle of reflection as a reference.

More specifically, for example, on the paper surface of FIG. 1, a ray takes an optical path in which, if an angle of reflection in the first reflection (reflection on the surface A) has a positive sign (the case in which a reflected light exists in the counterclockwise direction on the paper surface of the figure of a plane normal line), an angle of reflection in the second reflection (re-reflection on the surface A) has a negative sign (the case in which a reflected light exists in the clockwise direction in the paper surface of the figure of the plane normal line).

Since the light beam substantially moves back and forth between the first surface and the second surface by taking such an optical path, a space in the first optical system can be effectively utilized to gain an optical path length. Moreover, a small optical system can be realized even if an optical path is long.

Each of the above-mentioned embodiments will be hereinafter described using numerical examples.

FIRST NUMERICAL EXAMPLE

Figure 17:
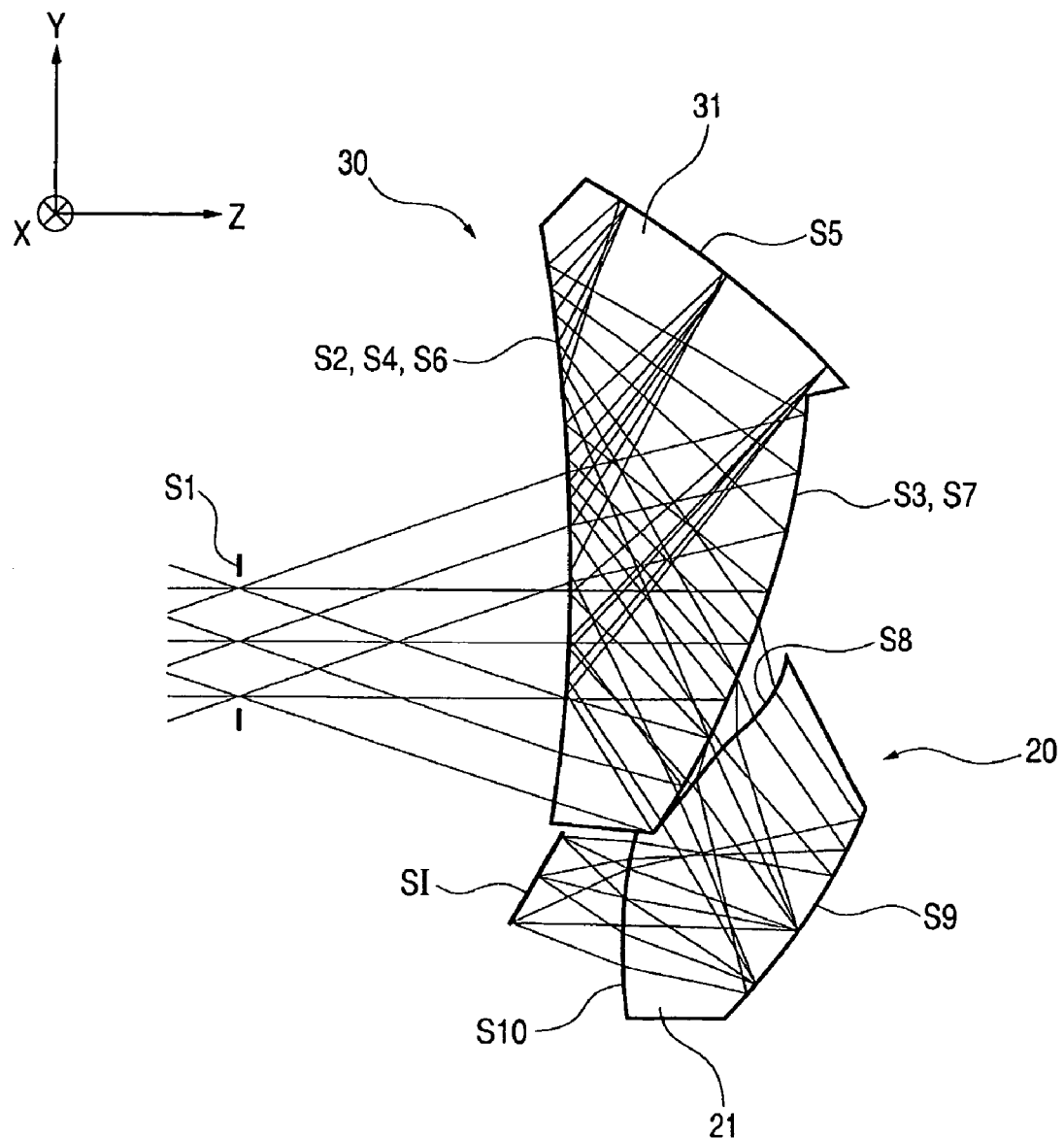
FIG. 17 is a sectional view of an optical system of first Numerical Example of the present invention.

FIG. 17 shows an optical path sectional view with a numerical example of first Embodiment shown in FIG. 1. In the figure, reference numeral 30 denotes a first optical system, which is constituted by a transparent body (first optical element) 31 of a prism shape having three optical surfaces. Reference symbols S2, S4, and S6 denote an identical surface; and S3 and S7, an identical surface. These two surfaces and S5 correspond to the surfaces 31b, 31a, and 31c described in first Embodiment, respectively.

Reference numeral 20 denotes a second optical system, which is constituted by a transparent body (second optical element) 21 consisting of an identical medium having three surfaces of S8, S9 and S10. These three surfaces correspond to the surfaces 21c, 21b, and 21a described in first Embodiment, respectively. Reference symbol SI represents an image display surface, and reference symbol S1 represents an exit pupil S of a display optical system.

In this numerical example, all the optical surfaces S1 to S10 are rotation asymmetrical surfaces, which are formed in a plane symmetrical shape having the paper surface of the figure (yz section) as an only symmetrical surface.

Further, x, y and z in the figure define a coordinate system with an optical axis direction of an observer as the z axis, a direction perpendicular to the z axis in the paper surface of the figure as the y axis, and a direction perpendicular to the paper surface as the x axis.

Optical data of this numerical example is shown in Table 1. The leftmost item SURF among the optical data of Table 1 represents a surface number. In addition, X, Y and Z represent positions (x, y, z) of surface vertexes of the surfaces in the coordinate system with the center of the first surface S1 at the origin (0, 0, 0) and the y axis and the z axis shown in the figure and the x axis in the depth direction on the paper surface of the figure. A represents a rotation angle a (unit: degree) around the x axis with the counterclockwise direction on the figure as the positive direction.

R represents a radius of curvature. TYP represents a type of a surface shape, SPH represents a sphere, and FFS represents a rotation asymmetrical surface in accordance with the following expression: Equation 1

$$z = (1/R)(x^2+y^2)/\left(1+(1-(1+k)(1/R)^2(x^2+y^2))^{(1/2)}\right) + c2 + c4\,y + \quad (1)$$
$$c5(x^2-y^2) + c6(-1+2x^2+2y^2) + c10(-2y+3x^2y+3y^3) +$$
$$c11(3x^2y-y^3)\,c12(x^4-6x^2y^2+y^4) +$$
$$c13(-3x^2+4x^4+3y^2-4y^4) +$$
$$c14(1-6x^2+6x^4-y^2+12x^2y^2+6y^4) +$$
$$c20(3y-12x^2y+10x^4y-12y^3+20x^2y^3+10y^6) +$$

A numerical value written besides FFS and XYP in the column of TYP indicates that the surface shape is a rotation symmetrical shape corresponding to aspheric coefficients k and ci (i=1, 2, 3 . . . ) written in the lower part of the table.

Values of k and ci left blank in the table are zero in any case.

Nd and vd (written as vd in the table) represent an index of refraction and an Abbe number at a d-line wavelength of a medium of the surface and subsequent surfaces, respectively. A change of a sign of the index of the index of refraction Nd indicates that a ray is reflected on the surface. In addition, if the medium is an air layer, only the index of refraction shown as 1.000 and the Abbe number vd is omitted.

The above-mentioned items of the table are the same for numerical examples described below.

TABLE 1

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | 0.0 |
| 2 | 0.000 | −2.273 | 24.000 | −3.345 | −247.2785 | FFS1 | 1.5709 | 33.8 |
| 3 | 0.000 | −5.208 | 35.525 | −27.157 | −67.1042 | FFS2 | −1.5709 | 33.8 |
| 4 | 0.000 | −2.273 | 24.000 | −3.345 | −247.2785 | FFS1 | 1.5709 | 33.8 |
| 5 | 0.000 | 16.473 | 47.429 | 41.765 | −111.3783 | FFS3 | −1.5709 | 33.8 |
| 6 | 0.000 | −2.273 | 24.000 | −3.345 | −247.2785 | FFS1 | 1.5709 | 33.8 |
| 7 | 0.000 | −5.208 | 35.525 | −27.157 | −67.1042 | FFS2 | 1.0000 | 0.0 |
| 8 | 0.000 | −11.004 | 33.190 | −41.277 | 15.9216 | FFS4 | 1.5709 | 33.8 |
| 9 | 0.000 | −22.423 | 40.960 | −38.154 | −42.7750 | FFS5 | −1.5709 | 33.8 |
| 10 | 0.000 | −23.731 | 28.162 | 0.720 | 26.4519 | FFS6 | −1.0000 | 0.0 |
| I | 0.000 | −23.856 | 18.216 | −30.353 | ∞ | SPH | −1.0000 | 0.0 |

| | | | | |
|---|---|---|---|---|
| FFS1 | c1 = 4.2201e+001 | c5 = −7.2651e−006 | c6 = −6.7463e−004 | c10 = −4.3866e−006 |
| | c11 = −2.9188e−005 | c12 = 3.8137e−008 | c13 = 1.6783e−008 | c14 = 7.7366e−008 |
| FFS2 | c1 = 6.8375e−001 | c5 = 1.3989e−004 | c6 = 1.2750e−004 | c10 = 6.3376e−007 |
| | c11 = −2.2030e−005 | c12 = −8.2897e−008 | c13 = 1.1270e−007 | c14 = 6.4467e−008 |
| FFS3 | c1 = −2.3229e+000 | c5 = 1.4037e−004 | c6 = −5.5792e−004 | c10 = −8.1600e−006 |
| | c11 = 5.1550e−006 | c12 = 2.8932e−007 | c13 = −1.8001e−008 | c14 = 1.2472e−009 |
| FFS4 | c1 = −1.0391e+000 | c5 = 2.2120e−003 | c6 = −8.0615e−003 | c10 = −1.0945e−004 |
| | c11 = 4.4108e−005 | c12 = 7.0952e−006 | c13 = 6.2837e−006 | c14 = −1.4557e−005 |
| FFS5 | c1 = −8.1246e+000 | c5 = −5.3103e−004 | c6 = −6.8410e−004 | c10 = −3.2097e−005 |
| | c11 = −2.0613e−006 | c12 = 1.0051e−006 | c13 = 1.0560e−006 | c14 = −5.9957e−007 |
| FFS6 | c1 = 2.7242e+000 | c5 = 2.4272e−003 | c6 = −5.7624e−003 | c10 = 7.1569e−005 |
| | c11 = 7.4246e−004 | c12 = −6.1419e−006 | c13 = −7.4558e−006 | c14 = 1.4723e−005 |

-continued
$$c21(-12x^2y+15x^4y+4y^3+10x^2y^3-5y^5) +$$
$$c22(5x^4y-10x^2y^3+y^5) + c23(x^6-15x^4y^2+15x^2y^4-y^6) +$$
$$c24(-5x^4+6x^6+30x^2y^2-30x^4y^2-5y^4-30x^2y^4+6y^6) +$$
$$c25(6x^2-20x^4+15x^6-6y^2+15x^4y^2+20y^4-15x^2y^4 -$$
$$15y^6) + c26(-1+12x^2-30x^4+20x^6+12y^2 -$$
$$60x^2y^2+60x^4y^2-30y^4+60x^2y^4+20y^6) + \ldots$$

In addition, the surface shape may be defined by other expressions. XYP in the term of TYP is a rotation asymmetrical surface in accordance with the following expression:
Equation 2

$$z = (1/R)(x^2+y^2)/\left(1+(1-(1+k)(1/R)^2(x^2+y^2))^{(1/2)}\right) + \quad (2)$$
$$c2\,x + c3\,y + c4\,x^2 + c5\,xy + c6\,y^2 +$$
$$c7\,x^3 + c8\,x^2y + c9\,xy^2 + c10\,y^3 + c11\,x^4 +$$
$$c12\,x^3y + c13\,x^2y^2 + c14\,xy^3 + c15\,y^4$$

As it is seen from Table 1, light from the image display surface SI is made incident on the second optical element 21 from S10 (surface 21a), reflected on S9 (surface 21b), transmitted through S8 (surface 21c) and exits the second optical element 21. The light that has exit from the exit surface (S8) of the second optical element 21 is transmitted through S7 (surface 31a), made incident on the first optical element 31 (first optical system 30), reflected on S6 (surface 31b), returned and reflected on S5 (surface 31c), re-reflected on S4 (surface 31b), reflected on S3 (surface 31a), transmitted through S2 (surface 31b) and exits the first optical element 31 to be guided to the exit pupil S1. The observer can observe an enlarged image on the image display surface by placing an eye in a position of the exit pupil.

When it is assumed that a numerical value having a dimension of this numerical example is represented by mm, a display optical system is obtained which displays an image with a horizontal angle of view of about 50° and a vertical angle of view of about 39° at an exit pupil diameter φ of 6 mm and an image display size of around 10 mm×7.5 mm in the infinity in the positive direction of the z axis.

Further, the optical system of this numerical example may be utilized in an image taking optical system. In this case, light from a subject at the infinity in the z axis negative direction passes through the stop S1 and is incident on the first optical element 31 from S2, and reflected on S3, S4, S5 and S6 to exit the first optical element 31 from S7. The light that has exit the first optical element 31 is guided to the second optical element 21 and focuses an outside (subject) image on the image taking surface SI via S8, S9 and S10.

SECOND NUMERICAL EXAMPLE

Figure 18:
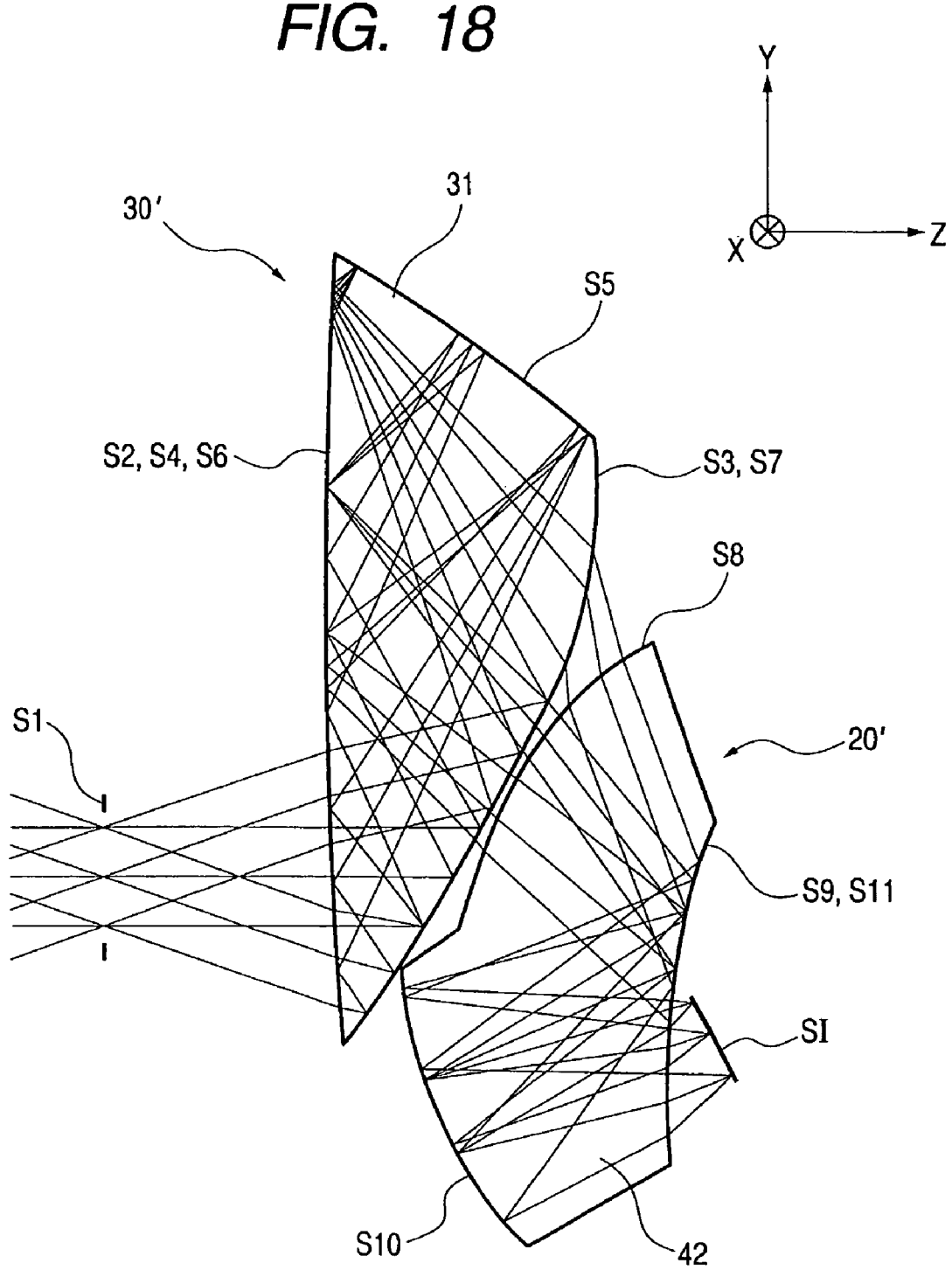
FIG. 18 is a sectional view of an optical system of second Numerical Example of the present invention.

FIG. 18 shows an optical path sectional view with a numerical example of second Embodiment shown in FIG. 2. Optical data of this example is shown in Table 2.

In the figure, reference numeral 30' denotes a first optical system, which is constituted by a transparent body (first optical element) 31 of a prism shape having three optical surfaces.

element 22. The light that has exit from the exit surface (S8) of the second optical system 20' is transmitted through S7 (surface 31a), incident on the first optical element 31 (first optical system 30'), reflected on S6 (surface 31b), returned and reflected on S5 (surface 31c), re-reflected on S4 (surface 31b), reflected on S3 (surface 31a), transmitted through S2 (surface 31b) and exits the first optical element 31 to be guided to the exit pupil S1.

The observer can observe an enlarged image on the image display surface by placing an eye in a position of the exit pupil.

TABLE 2

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | 0.0 |
| 2 | 0.000 | 4.519 | 19.725 | 1.167 | −1736.3277 | FFS1 | 1.5709 | 33.8 |
| 3 | 0.000 | 4.100 | 32.361 | −30.359 | −109.6220 | FFS2 | −1.5709 | 33.8 |
| 4 | 0.000 | 4.519 | 19.725 | 1.167 | −1736.3277 | FFS1 | 1.5709 | 33.8 |
| 5 | 0.000 | 31.151 | 48.842 | 48.213 | −122.5937 | FFS3 | −1.5709 | 33.8 |
| 6 | 0.000 | 4.519 | 19.725 | 1.167 | −1736.3277 | FFS1 | 1.5709 | 33.8 |
| 7 | 0.000 | 4.100 | 32.361 | −30.359 | −109.6220 | FFS2 | 1.0000 | 0.0 |
| 8 | 0.000 | 10.422 | 36.716 | −32.050 | 18.7046 | FFS4 | 1.5709 | 33.8 |
| 9 | 0.000 | −13.564 | 48.290 | −4.970 | 139.5528 | FFS5 | −1.5709 | 33.8 |
| 10 | 0.000 | −26.101 | 32.187 | 35.158 | 37.0465 | FFS6 | 1.5709 | 33.8 |
| 11 | 0.000 | −13.564 | 48.290 | −4.970 | 139.5528 | FFS5 | 1.0000 | 0.0 |
| I | 0.000 | −14.308 | 52.447 | 28.702 | ∞ | SPH | 1.0000 | 0.0 |

| | | | | |
|---|---|---|---|---|
| FFS1 | $c1 = -2.4378e+006$ | $c5 = 7.6075e-005$ | $c6 = 6.2917e-004$ | $c10 = 5.5959e-006$ |
| | $c11 = 2.1685e-005$ | $c12 = -8.2021e-009$ | $c13 = 5.9043e-008$ | $c14 = 1.0572e-008$ |
| FFS2 | $c1 = 8.2754e+000$ | $c5 = -4.9930e-004$ | $c6 = 5.8730e-004$ | $c10 = -1.5117e-005$ |
| | $c11 = 1.5560e-005$ | $c12 = -1.6187e-007$ | $c13 = -1.1396e-008$ | $c14 = 8.3568e-008$ |
| FFS3 | $c1 = -8.0071e-001$ | $c5 = -9.5216e-004$ | $c6 = 2.2840e-004$ | $c10 = 4.9947e-006$ |
| | $c11 = -4.8150e-006$ | $c12 = -3.8819e-007$ | $c13 = 4.1668e-007$ | $c14 = 2.5137e-007$ |
| FFS4 | $c1 = -9.4462e-001$ | $c5 = -1.8830e-003$ | $c6 = -5.9203e-003$ | $c10 = 1.2950e-004$ |
| | $c11 = -7.4459e-005$ | $c12 = -1.4290e-006$ | $c13 = -1.3262e-006$ | $c14 = -1.0302e-006$ |
| FFS5 | $c1 = 4.9257e+001$ | $c5 = -4.5142e-004$ | $c6 = 1.0487e-003$ | $c10 = -5.5426e-005$ |
| | $c11 = -9.5671e-006$ | $c12 = -1.0091e-007$ | $c13 = 5.0536e-007$ | $c14 = 1.2849e-006$ |
| FFS6 | $c1 = 1.1901e-001$ | $c5 = 1.1105e-004$ | $c6 = -7.4056e-005$ | $c10 = 1.3669e-005$ |
| | $c11 = -5.6456e-006$ | $c12 = -3.6994e-008$ | $c13 = 2.1088e-008$ | $c14 = -8.9699e-008$ |

Reference symbols S2, S4, and S6 denote an identical surface; and S3 and S7, an identical surface. These two surfaces and S5 correspond to the surfaces 31b, 31a, and 31c described in second Embodiment, respectively.

Reference numeral 20' denotes a second optical system, which is constituted by a transparent body (second optical element) 22 consisting of an identical medium having three surfaces of S8, S9 (identical surface with S11), and S10. These three surfaces correspond to the surfaces 22c, 22a, and 22b described in first Embodiment, respectively. Reference symbol SI represents an image display surface, and reference symbol S1 represents an exit pupil S of a display optical system.

In this numerical example, all the optical surfaces S1 to S11 are rotation asymmetrical surfaces, which are formed in a plane symmetrical shape having the paper surface of the figure (yz section) as an only symmetrical surface.

Further, x, y and z in the figure define a coordinate system with an optical axis direction of an observer as the z axis, a direction perpendicular to the z axis in the paper surface of the figure as the y axis, and a direction perpendicular to the paper surface as the x axis.

Light from the image display surface SI is incident on the second optical element 22 from S11 (surface 22a), reflected on S10 (surface 22b), reflected on S9 (surface 22a), transmitted through S8 (surface 22c) and exits the second optical When it is assumed that a numerical value having a dimension of this numerical example is represented by mm, a display optical system is obtained which has substantially the same specification as those of the display optical system in first Numerical Example.

Further, the optical system of this numerical example may be utilized in an image taking optical system. In this case, light from a subject at the infinity in the z axis negative direction passes through the stop S1 and is incident on the first optical element 31 from S2, and reflected on S3, S4, S5 and S6 to exit the first optical element 31 from S7. The light that has exit the first optical element 31 is guided to the second optical element 21 and focuses an outside (subject) image on the image taking surface SI via S8, S9, S10, and S11.

THIRD NUMERICAL EXAMPLE

Figure 19:
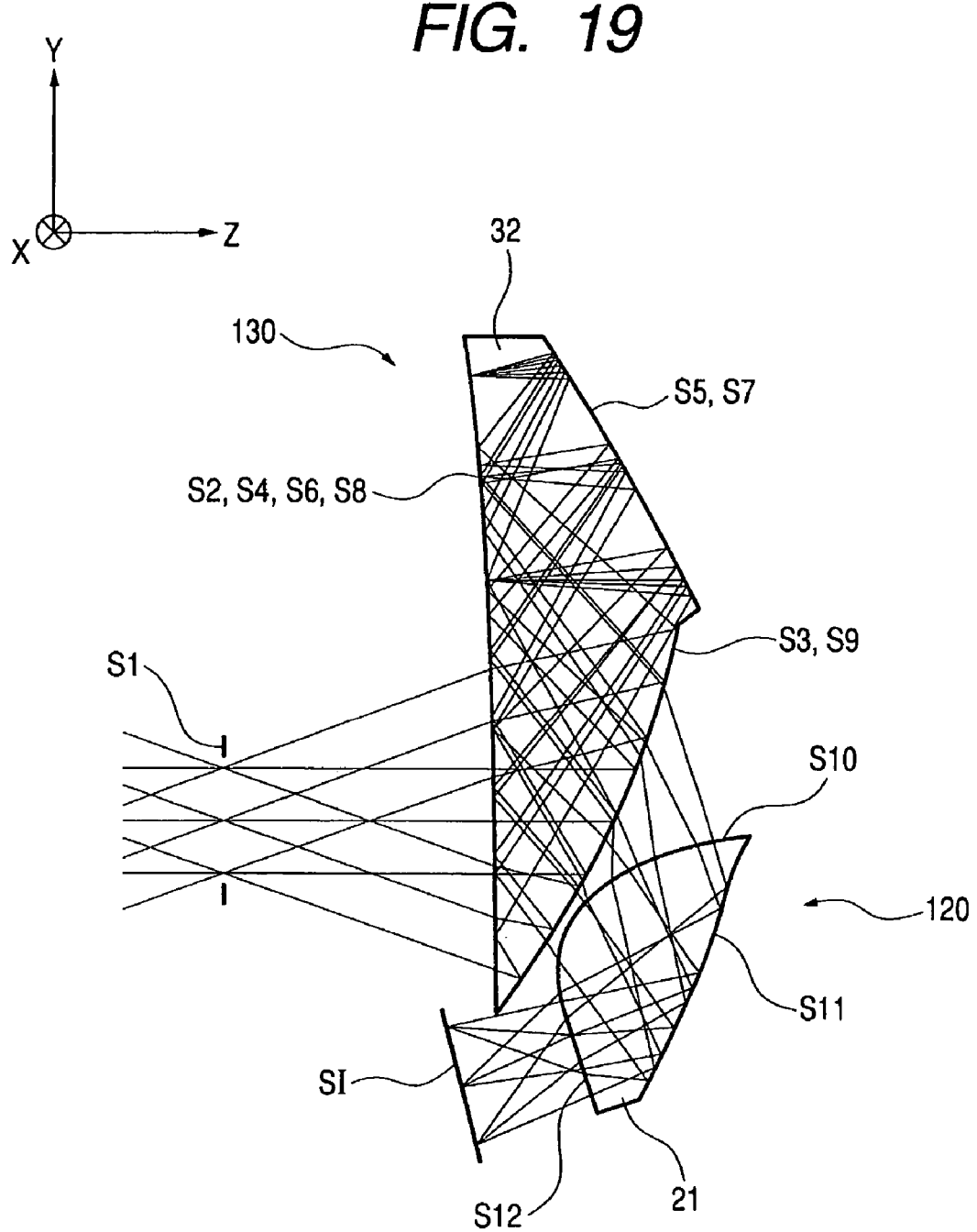
FIG. 19 is a sectional view of an optical system of third Numerical Example of the present invention.

FIG. 19 shows an optical path sectional view with a numerical example of third Embodiment shown in FIG. 4. Optical data of this example is shown in Table 3.

In the figure, reference numeral 130 denotes a first optical system, which is constituted by a transparent body (first optical element) 32 of a prism shape having three optical surfaces. Reference symbols S2, S4, S6 and S8 denote an identical surface; S3 and S9, an identical surface; and S5 and S7, an identical surface. These three surfaces correspond to the surfaces 32b, 32a, and 32c described in third Embodiment, respectively.

Reference numeral 120 denotes a second optical system, which is constituted by a transparent body (second optical element) 21 consisting of an identical medium having three surfaces of S10, S11 and S12. These three surfaces correspond to the surfaces 21c, 21b, and 21a described in first Embodiment as shown in FIG. 1, respectively. Reference symbol SI represents an image display surface, and reference symbol S1 represents an exit pupil S of a display optical system.

In this numerical example, all the optical surfaces S1 to S12 are rotation asymmetrical surfaces, which are formed in a plane symmetrical shape having the paper surface of the figure (yz section) as an only symmetrical surface.

Further, x, y and z in the figure define a coordinate system with an optical axis direction of an observer as the z axis, a direction perpendicular to the z axis in the paper surface of the figure as the y axis, and a direction perpendicular to the paper surface as the x axis.

Light from the image display surface SI is incident on the second optical element 21 from S12 (surface 21a), reflected on S11 (surface 21b), transmitted through S10 (surface 21c) and exits the second optical element 21.

The light that has exit from the exit surface (S10) of the second optical element 21 is transmitted through S9 (surface 32a), incident on the first optical element 32 (first optical system 130), reflected on S8 (surface 32b), reflected on S7 (surface 32c), returned and reflected on S6 (surface 32b), re-reflected on S5 (surface 32c), reflected on S4 (surface 32b), reflected on S3 (surface 32a), transmitted through S2 (surface 32b) and exits the first optical element 32 to be guided to the exit pupil S1.

The observer can observe an enlarged image on the image display surface by placing an eye in a position of the exit pupil.

When it is assumed that a numerical value having a dimension of this numerical example is represented by mm, a display optical system is obtained which has substantially the same specification as those of the display optical system in First Numerical Example.

Further, the optical system of this numerical example may be utilized in an image taking optical system. In this case, a ray from an object point at the infinity in the z axis negative direction is guided to the first optical element 32 through the stop S1. Then, the ray is incident on the first optical element 32 from S2, reflected on S3, reflected on S4, reflected on S5 and returned and reflected on S6, and thereafter, reflected on S7, reflected on S8 and exits the first optical element 32 from S9 to be guided to the second optical element 22. The light guided to the second optical element 22 is incident on is focused on the image taking surface SI via S10, S11, and S12.

FOURTH NUMERICAL EXAMPLE

Figure 20:
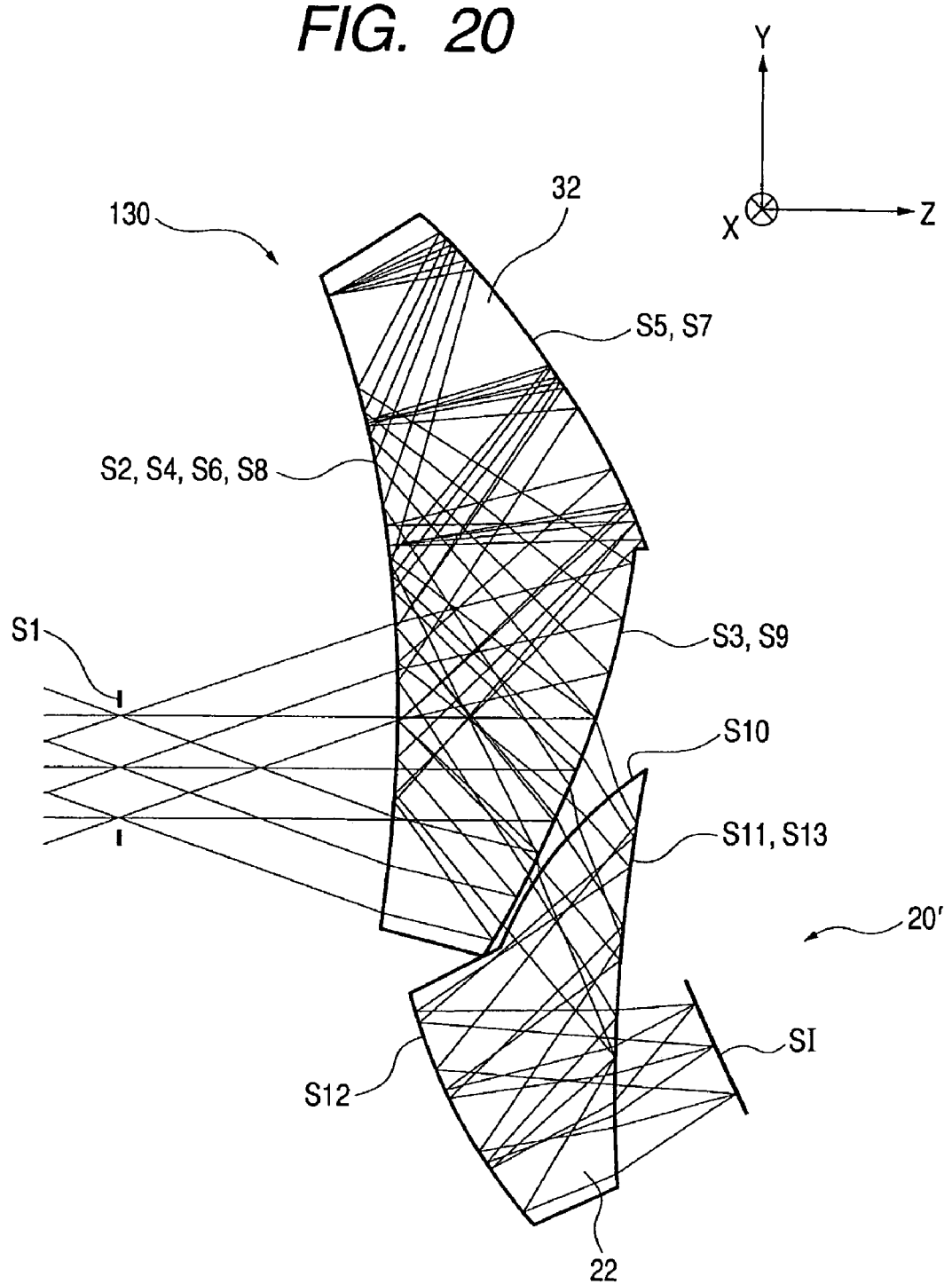
FIG. 20 is a sectional view of an optical system of fourth Numerical Example of the present invention.

FIG. 20 is an optical path sectional view with another numerical example of third Embodiment shown in FIG. 4. Table 4 shows optical data.

In the figure, reference numeral 130 denotes a first optical system, which is constituted by a transparent body (first optical element) 32 of a prism shape having three optical surfaces. Reference symbols S2, S4, S6 and S8 denote an identical surface; S3 and S9, an identical surface; and S5 and S7, an identical surface. These three surfaces correspond to the surfaces 32b, 32a, and 32c described in third Embodiment, respectively.

Reference numeral 20' denotes a second optical system, which is constituted by a transparent body (second optical element) 22 consisting of an identical medium having three surfaces of S10, S11 (identical surface with S13), and S12 in this case. These three surfaces correspond to the surfaces 22c, 22a, and 22b of FIG. 2 as described in second Embodiment. Reference symbol SI denotes an image display surface and reference symbol S1 denotes an exit pupil S of the display optical system.

In this numerical example, all the optical surfaces S1 to S13 are rotation asymmetrical surfaces, which are formed in a

TABLE 3

| SURF | X | Y | Z | A | R | TYP | Nd | vd |
|------|-----|-----|-----|-----|-----|-----|-----|-----|
| 1 | 0.000 | 0.000 | 0.000 | 0.000 | ∞ | SPH | 1.0000 | 0.0 |
| 2 | 0.000 | 28.526 | 20.239 | 4.593 | −204.6392 | FFS1 | 1.5745 | 33.8 |
| 3 | 0.000 | 7.627 | 33.817 | −19.766 | −67.7133 | FFS2 | −1.5745 | 33.8 |
| 4 | 0.000 | 28.526 | 20.239 | 4.593 | −204.6392 | FFS1 | 1.5745 | 33.8 |
| 5 | 0.000 | 36.806 | 25.514 | 33.313 | −130.8385 | FFS3 | −1.5745 | 33.8 |
| 6 | 0.000 | 28.526 | 20.239 | 4.593 | −204.6392 | FFS1 | 1.5745 | 33.8 |
| 7 | 0.000 | 36.806 | 25.514 | 33.313 | −130.8385 | FFS3 | −1.5745 | 33.8 |
| 8 | 0.000 | 28.526 | 20.239 | 4.593 | −204.6392 | FFS1 | 1.5745 | 33.8 |
| 9 | 0.000 | 7.627 | 33.817 | −19.766 | −67.7133 | FFS2 | 1.0000 | 0.0 |
| 10 | 0.000 | −3.713 | 32.000 | −61.016 | 12.9947 | FFS4 | 1.5745 | 33.8 |
| 11 | 0.000 | −9.313 | 38.162 | −20.071 | −122.7345 | FFS5 | −1.5745 | 33.8 |
| 12 | 0.000 | −9.474 | 26.572 | −9.403 | 11.5332 | FFS6 | −1.0000 | 0.0 |
| I | 0.000 | −7.746 | 16.137 | 12.495 | ∞ | SPH | −1.0000 | 0.0 |

FFS1 $c1 = -4.0335e+000$ $c5 = -5.7321e-004$ $c6 = -4.6692e-005$ $c10 = -2.0110e-006$
$c11 = 1.1077e-005$ $c12 = 1.0862e-008$ $c13 = -2.2107e-009$ $c14 = 2.9702e-009$
FFS2 $c1 = -9.4887e-001$ $c5 = -6.6360e-004$ $c6 = 1.2157e-004$ $c10 = 4.2469e-006$
$c11 = -4.5938e-006$ $c12 = 2.4535e-008$ $c13 = -2.1846e-007$ $c14 = 4.9945e-008$
FFS3 $c1 = -1.5093e+000$ $c5 = -5.4396e-004$ $c6 = 1.0629e-004$ $c10 = 8.7543e-007$
$c11 = 1.2883e-005$ $c12 = 2.1023e-007$ $c13 = -4.0124e-008$ $c14 = 9.3897e-010$
FFS4 $c1 = -6.9842e-001$ $c5 = 4.3200e-003$ $c6 = 4.1777e-004$ $c10 = -1.7318e-004$
$c11 = -5.6073e-005$ $c12 = -2.1928e-008$ $c13 = 9.5676e-006$ $c14 = -6.5617e-006$
FFS5 $c1 = -7.4465e+001$ $c5 = 3.5070e-005$ $c6 = -4.3265e-004$ $c10 = 3.2961e-005$
$c11 = 2.1191e-005$ $c12 = 2.4966e-006$ $c13 = 5.1658e-006$ $c14 = 2.2219e-006$
FFS6 $c1 = -1.6588e+000$ $c5 = 4.9496e-003$ $c6 = 1.2913e-003$ $c10 = 2.3807e-004$
$c11 = -7.6089e-005$ $c12 = -4.4118e-006$ $c13 = -2.9948e-006$ $c14 = 5.9707e-006$ plane symmetrical shape having the paper surface of the figure (yz section) as an only symmetrical surface.

Further, x, y and z in the figure define a coordinate system with an optical axis direction of an observer as the z axis, a direction perpendicular to the z axis in the paper surface of the figure as the y axis, and a direction perpendicular to the paper surface as the x axis.

Light from the image display surface SI is incident on the second optical element 22 from S13 (surface 22a), reflected on S12 (surface 22b), reflected on S11 (surface 22a), transmitted through S10 (surface 22c) and exits the second optical element 22.

The light that has exit from the exit surface (S10) of the second optical element 22 is transmitted through S9 (surface 32a), incident on the first optical element 32 (first optical system 130), reflected on S8 (surface 32b), reflected on S7 surface 32c), returned and reflected on S6 (surface 32b re-reflected on S5 (surface 32c), reflected on S4 (surface 32b), reflected on S3 (surface 32a), transmitted through S2 (surface 32b) and exits the optical element 32 to be guided to the exit S1.

The observer can observe an enlarged image on age display surface by placing an eye in a on of the exit pupil.

FIFTH NUMERICAL EXAMPLE

Figure 21:
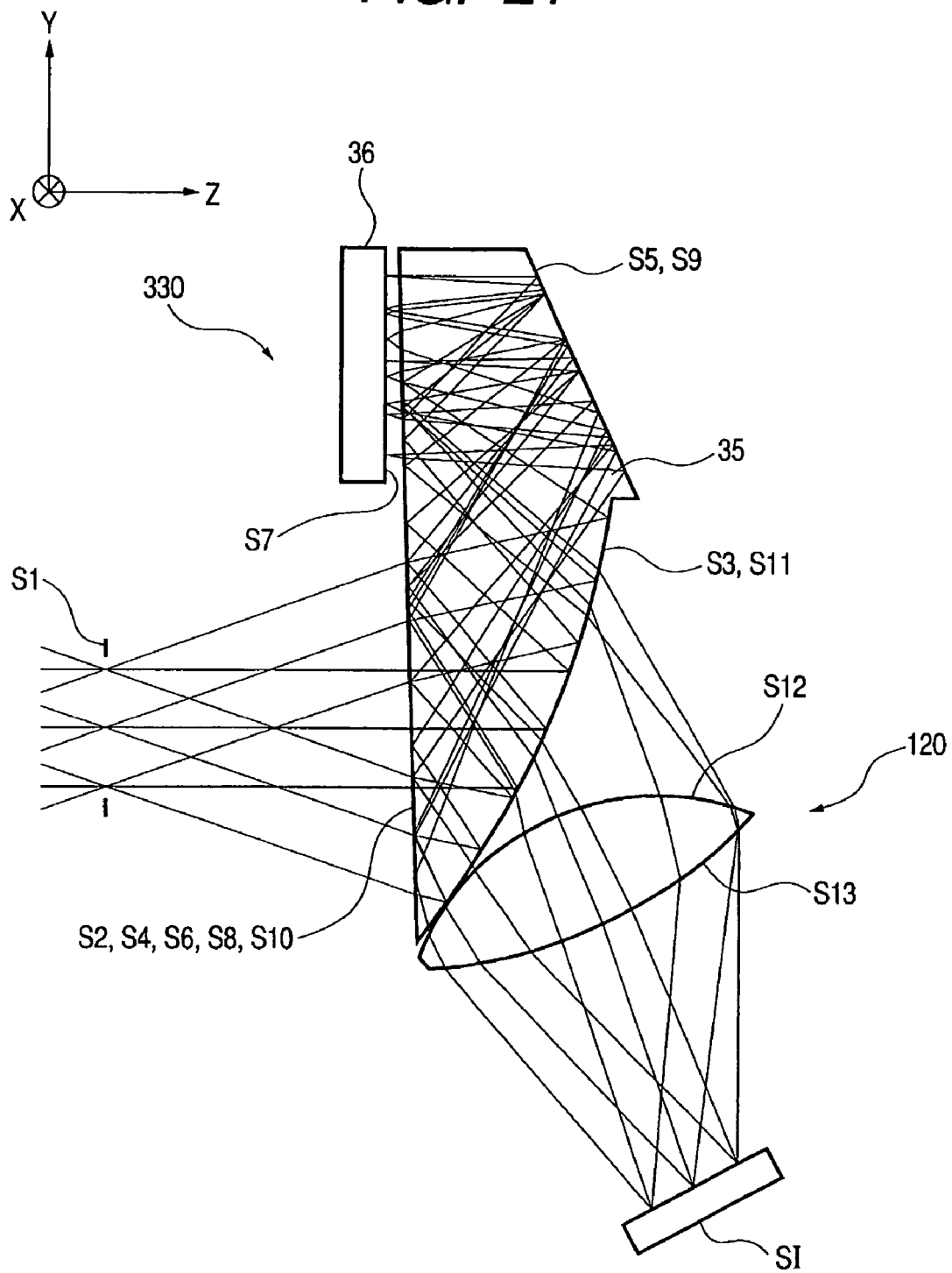
FIG. 21 is a sectional view of an optical system of fifth Numerical Example of the present invention.

FIG. 21 shows an optical path sectional view with a numerical example of fifth Embodiment shown in FIG. 6. Table 5 shows optical data.

In the figure, reference numeral 330 denotes a first optical system, which is constituted by a transparent body (optical element) 35 of a prism shape having three optical surfaces and a reflection mirror member 36. Reference symbols S2, S4, S6, S8, and S10 denote an identical surface; S3 and S11, an identical surface; and S5 and S9, an identical surface. These three surfaces correspond to the surfaces 35b, 35a, and 35c described in fifth Embodiment, respectively. Also, S7 corresponds to the surface 36a described in fifth Embodiment.

Reference numeral 120 denotes a second optical system, which is constituted by a transparent body (second optical element) 22 consisting of an identical medium having two surfaces of S12 and S13 and S12. Reference Symbol SI denotes an image display surface and reference symbol S1 denotes an exit pupil S of the display optical system.

In this numerical example, all the optical surfaces S to S13 are rotation asymmetrical surfaces, which are formed in a plane symmetrical shape having the paper surface of the figure (yz section) as an only symmetrical surface.

Further, x, y and z in the figure define a coordinate system with an optical axis direction of an observer as the z axis, a

TABLE 4

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | 0.0 |
| 2 | 0.000 | 1.717 | 23.030 | −1.590 | −163.6302 | FFS1 | 1.5709 | 33.8 |
| 3 | 0.000 | −4.041 | 36.472 | −25.389 | −74.5831 | FFS2 | −1.5709 | 33.8 |
| 4 | 0.000 | 1.717 | 23.030 | −1.590 | −163.6302 | FFS1 | 1.5709 | 33.8 |
| 5 | 0.000 | 20.058 | 43.156 | 24.479 | −111.8720 | FFS3 | −1.5709 | 33.8 |
| 6 | 0.000 | 1.717 | 23.030 | −1.590 | −163.6302 | FFS1 | 1.5709 | 33.8 |
| 7 | 0.000 | 20.058 | 43.156 | 24.479 | −111.8720 | FFS3 | −1.5709 | 33.8 |
| 8 | 0.000 | 1.717 | 23.030 | −1.590 | −163.6302 | FFS1 | 1.5709 | 33.8 |
| 9 | 0.000 | −4.041 | 36.472 | −25.389 | −74.5831 | FFS2 | 1.0000 | 0.0 |
| 10 | 0.000 | −3.856 | 38.922 | −48.121 | 32.7675 | FFS4 | 1.5709 | 33.8 |
| 11 | 0.000 | −2.292 | 43.512 | −8.129 | 734.3017 | FFS5 | −1.5709 | 33.8 |
| 12 | 0.000 | −23.771 | 25.974 | 21.576 | 47.5264 | FFS6 | 1.5709 | 33.8 |
| 13 | 0.000 | −2.292 | 43.512 | −8.129 | 734.3017 | FFS5 | 1.0000 | 0.0 |
| I | 0.000 | −13.956 | 45.894 | 22.318 | ∞ | SPH | 1.0000 | 0.0 |

| | | | | |
|---|---|---|---|---|
| FFS1 | $c1 = 5.3885e+000$ | $c5 = -1.4286e-004$ | $c6 = -3.3833e-004$ | $c10 = -3.9283e-006$ |
| | $c11 = 6.8899e-006$ | $c12 = -2.7344e-008$ | $c13 = 6.7957e-009$ | $c14 = -1.2389e-009$ |
| FFS2 | $c1 = 1.0113e-002$ | $c5 = 5.5884e-004$ | $c6 = 2.7503e-004$ | $c10 = 8.8466e-006$ |
| | $c11 = 2.2294e-006$ | $c12 = 2.4177e-008$ | $c13 = 4.1841e-008$ | $c14 = -2.7567e-008$ |
| FFS3 | $c1 = 1.8410e-001$ | $c5 = 3.6922e-006$ | $c6 = -3.1005e-004$ | $c10 = -5.5644e-007$ |
| | $c11 = 3.8280e-006$ | $c12 = -3.4678e-008$ | $c13 = 8.1421e-008$ | $c14 = -7.9241e-008$ |
| FFS4 | $c1 = -1.1352e+000$ | $c5 = -4.0246e-003$ | $c6 = -2.9791e-004$ | $c10 = -1.5075e-004$ |
| | $c11 = 4.3384e-005$ | $c12 = -1.2122e-006$ | $c13 = 1.0628e-006$ | $c14 = -5.8225e-006$ |
| FFS5 | $c1 = 3.3555e+002$ | $c5 = -4.1408e-004$ | $c6 = -7.4437e-005$ | $c10 = -1.0044e-006$ |
| | $c11 = 5.6621e-006$ | $c12 = -4.4079e-008$ | $c13 = -3.2724e-008$ | $c14 = 7.1532e-008$ |
| FFS6 | $c1 = 8.7800e-002$ | $c5 = 1.8963e-004$ | $c6 = 1.3556e-004$ | $c10 = -9.0087e-006$ |
| | $c11 = 1.5110e-006$ | $c12 = 1.2148e-007$ | $c13 = -1.0245e-007$ | $c14 = -4.9976e-008$ |

When it is assumed that a numerical value having a dimension in length of this numerical example is represented by mm, a display optical system is obtained which is substantially the same in specification as in first Numerical Example.

Further, the optical system of this numerical example may be utilized in an image taking optical system. In this case, light from an object point at the infinitive distance in the z-axis negative direction passes through the stop S1, is guided to the first optical system 130, is incident on the first optical element 32 from S2, reflected on S3, S4, and S5, returned and reflected on S6, and then reflected on S7 and S8 to exit the first optical element 32 from S9. The light that has exit the first optical element 32 is guided to the second optical element 22 and focuses on the image taking surface SI via S10, S11 S12, and S13.

direction perpendicular to the z axis in the paper surface of the figure as the y axis, and a direction perpendicular to the paper surface as the x axis.

Light from the image display surface SI passes through S13 of the second optical system 120, exits S12, is transmitted through S11 (surface 35a), is incident on the optical element 35 of the first optical system 130, reflected on S10 (surface 35b), and S9 (surface 35c), refracted by S8 (surface 35b), and exits the optical element 35.

The light that has exit from the optical element 35 is returned and reflected on S7 (surface 36a), transmitted through S6 (surface 35b), incident on the optical element 35 again, reflected on S5 (surface 35c), S4 (surface 35b), and S3 (surface 35a), transmitted through S2 (surface 35b) and exits the optical element 35 to be guided to the exit pupil S1.

The observer can observe an enlarged image on the image display surface by placing an eye in a position of the exit pupil.

TABLE 5

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | 1.755 | 20.489 | 0.880 | −607.2300 | FFS1 | 1.5745 | 33.8 |
| 3 | 0.000 | 0.352 | 30.133 | −24.069 | −59.6754 | FFS2 | −1.5745 | 33.8 |
| 4 | 0.000 | 1.755 | 20.489 | 0.880 | −607.2300 | FFS1 | 1.5745 | 33.8 |
| 5 | 0.000 | 23.714 | 32.547 | 25.095 | −295.3234 | FFS3 | −1.5745 | 33.8 |
| 6 | 0.000 | 1.755 | 20.489 | 0.880 | −607.2300 | FFS1 | −1.0000 | |
| 7 | 0.000 | 1.724 | 18.489 | −1.620 | −2000.000 | SPH | 1.0000 | |
| 8 | 0.000 | 1.755 | 20.489 | 0.880 | −607.2300 | FFS1 | 1.5745 | 33.8 |
| 9 | 0.000 | 23.714 | 32.547 | 25.095 | −295.3234 | FFS3 | −1.5745 | 33.8 |
| 10 | 0.000 | 1.755 | 20.489 | 0.880 | −607.2300 | FFS1 | 1.5745 | 33.8 |
| 11 | 0.000 | 0.352 | 30.133 | −24.069 | −59.6754 | FFS2 | 1.0000 | |
| 12 | 0.000 | −7.189 | 28.468 | −57.836 | 13.6358 | FFS4 | 1.5745 | 33.8 |
| 13 | 0.000 | −13.875 | 32.576 | −66.833 | −25.0883 | FFS5 | 1.0000 | |
| I | 0.000 | −31.547 | 40.139 | −63.210 | ∞ | SPH | 1.0000 | |

| | | | | |
|---|---|---|---|---|
| FFS1 | $c_1$ = 5.1936e+001 | $c_5$ = −1.0304e−003 | $c_6$ = −1.8227e−005 | $c_{10}$ = 3.5979e−006 |
| | $c_{11}$ = −2.5096e−006 | $c_{12}$ = −7.4519e−008 | $c_{13}$ = −1.3933e−007 | $c_{14}$ = −1.7806e−008 |
| FFS2 | $c_1$ = −9.6500e−001 | $c_5$ = −9.3134e−004 | $c_6$ = −4.3744e−004 | $c_{10}$ = −4.8960e−008 |
| | $c_{11}$ = −1.1248e−006 | $c_{12}$ = 1.0577e−008 | $c_{13}$ = 8.6492e−008 | $c_{14}$ = 1.5783e−007 |
| FFS3 | $c_1$ = −1.7127e+003 | $c_5$ = −2.4479e−003 | $c_6$ = 8.2902e−005 | $c_{10}$ = 3.8688e−005 |
| | $c_{11}$ = −1.4501e−005 | $c_{12}$ = 1.5808e−007 | $c_{13}$ = −4.6303e−007 | $c_{14}$ = 2.9468e−007 |
| FFS4 | $c_1$ = −7.3615e−001 | $c_5$ = 8.2022e−004 | $c_6$ = −1.2095e−003 | $c_{10}$ = 1.3578e−004 |
| | $c_{11}$ = 3.2939e−005 | $c_{12}$ = 6.2055e−007 | $c_{13}$ = 9.3472e−008 | $c_{14}$ = −3.7753e−006 |
| FFS5 | $c_1$ = 1.7098e−001 | $c_5$ = 1.1702e−003 | $c_6$ = 1.6960e−003 | $c_{10}$ = 2.9578e−005 |
| | $c_{11}$ = 1.7027e−005 | $c_{12}$ = 6.9794e−007 | $c_{13}$ = −1.0985e−007 | $c_{14}$ = 3.9150e−006 |

When it is assumed that a numerical value having a dimension in length of this numerical system is represented by mm, a display optical system is obtained which is substantially the same in specification as in First Numerical Example.

Further, the optical system of this numerical example may be utilized in an image taking optical system. In this case, light from an object point at the infinitive in the z-axis negative direction passes through the stop S1 and is guided to the first optical system 330. Then, the light is incident on the optical element 35 of the first optical system 330 from S2, and reflected on S3, S4 and S5, and transmitted through S6 to exit the optical element 35. Thereafter, the light is returned and reflected on S7 (reflection mirror member 36) and, then, transmitted through S8 and incident on the optical element 35 again, reflected on S9 and S10, transmitted through S11 and exits the optical element 35 to be guided to the second optical system 120. The light guided to the optical element 22 of the second optical system 120 is focused on the image taking surface SI in the image taking device such as a CCD via S12 and S13.

SIXTH NUMERICAL EXAMPLE

Figure 22:
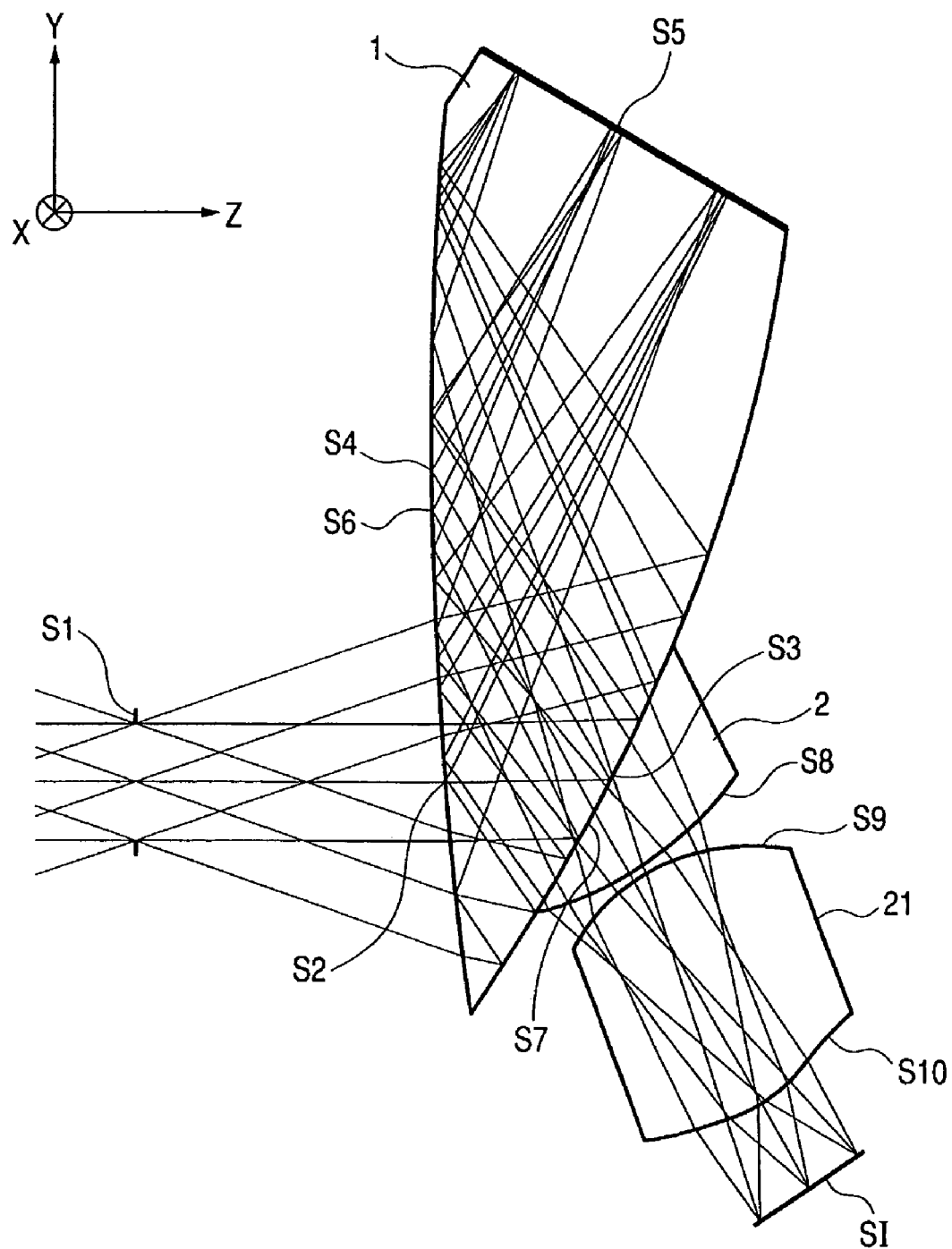
FIG. 22 is a sectional view of an optical system of sixth Numerical Example of the present invention.

FIG. 22 shows an optical path sectional view with a numerical example having a structure similar to seventh Embodiment shown in FIG. 10. In the figure, reference numeral 1 denotes a first optical element constituting a display optical system, which is constituted by a transparent body of a prism shape having three optical surfaces. Reference symbols S2, S4, and S6 denote an identical surface; and S3 and S7, an identical surface. These two surfaces and S5 correspond to the surfaces A, B and C described in first Embodiment, respectively.

Reference numeral 2 denotes a second optical element, which is formed in a lens shape having an exit surface S7, which is joined with a surface B (S3) of the first optical element 1, and an incident surface S8 in this context. Moreover, in this numerical example, the optical system has a lens (third optical element) 21 having an incident surface S10 and an exit surface S9. Reference symbol SI denotes an image display surface and S1 denotes an exit pupil S of the display optical system.

All the optical surfaces S1 to S10 are rotation asymmetrical surfaces, which are formed in a plane symmetrical shape having the paper surface of the figure (yz section) as an only symmetrical surface.

Further, x, y and z in the figure define a coordinate system with an optical axis direction of an observer as the z axis, a direction perpendicular to the z axis in the paper surface of the figure as the y axis, and a direction perpendicular to the paper surface as the x axis.

Optical data of this numerical example is shown in Table 6.

TABLE 6

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | |
| 2 | 0.000 | 9.756 | 20.453 | 3.090 | −707.5753 | FFS 1 | 1.5709 | 33.8 |
| 3 | 0.000 | 8.989 | 36.934 | −24.283 | −95.9929 | FFS 2 | −1.5709 | 33.8 |
| 4 | 0.000 | 9.756 | 20.453 | 3.090 | −707.5753 | FFS 1 | 1.5709 | 33.8 |
| 5 | 0.000 | 39.777 | 41.707 | 60.716 | −94.3252 | FFS 3 | −1.5709 | 33.8 |
| 6 | 0.000 | 9.756 | 20.453 | 3.090 | −707.5753 | FFS 1 | 1.5709 | 33.8 |

TABLE 6-continued

| 7 | 0.000 | 8.989 | 36.934 | −24.283 | −95.9929 | FFS 2 | 1.5709 | 33.8 |
| 8 | 0.000 | −5.343 | 35.332 | −56.227 | −17.6208 | FFS 4 | 1.0000 | |
| 9 | 0.000 | −5.390 | 36.825 | −66.347 | 13.2932 | FFS 5 | 1.5709 | 33.8 |
| 10 | 0.000 | −21.435 | 43.568 | −57.810 | −15.8583 | FFS 6 | 1.0000 | |
| I | 0.000 | −27.164 | 47.174 | −55.759 | ∞ | SPH | 1.0000 | |

| | | | | |
|---|---|---|---|---|
| FFS1 | k: −2.3815e+001 | c5: −2.2972e−003 | c6: 4.1134e−005 | c10: −1.6003e−006 |
| | c11: −8.6282e−006 | c12: 2.5025e−008 | c13: −7.6736e−008 | c14: −5.8211e−008 |
| FFS2 | k: −3.4702e+000 | c5: −1.0826e−003 | c6: −1.0474e−004 | c10: −2.4374e−006 |
| | c11: 1.5496e−005 | c12: −5.4746e−008 | c13: 5.8107e−008 | c14: 4.1281e−008 |
| FFS3 | k: 2.4750e+000 | c5: −1.4165e−003 | c6: 6.1833e−004 | c10: 2.0605e−005 |
| | c11: −1.1936e−005 | c12: 1.2206e−006 | c13: −2.3600e−007 | c14: 1.2763e−007 |
| FFS4 | k: −8.8735e−001 | c5: −3.3587e−003 | c6: 2.2399e−003 | c10: 6.5297e−005 |
| | c11: 5.8413e−005 | c12: −4.7978e−006 | c13: −1.5728e−006 | c14: 4.7732e−006 |
| FFS5 | k: −7.7137e−001 | c5: 1.4744e−003 | c6: −1.7815e−004 | c10: −6.8394e−005 |
| | c11: −2.7913e−005 | c12: −8.0087e−006 | c13: −2.5268e−006 | c14: −5.3295e−007 |
| FFS6 | k: −3.3293e+000 | c5: −1.9646e−003 | c8: −4.8134e−003 | c10: 8.1638e−005 |
| | c11: −9.6122e−005 | c12: 5.6339e−006 | c13: −8.3798e−008 | c14: 1.3794e−005 |

As it is seen from Table 6, light from the image display surface SI passes through the surfaces S10 and S9 of the lens 21 and travels toward the second optical element 2. The light traveling toward the second optical element 2 is incident on the second optical element 2 from the surface S8, transmitted through the joined surface S7 of the second optical element 2 and the first optical element 1 and incident on the first optical element 1, totally reflected on S6, reflected by the rear surface on S5, to which a reflective film is applied, to be returned, totally reflected on S4, reflected by the rear surface on S3, transmitted through S2 and exits from the first optical element 1 to be guided to the exit pupil S1 of the optical system.

When it is assumed that a numerical value having a dimension in length of this numerical example is represented by mm, a display optical system is obtained which displays an image with a horizontal angle of view of about 50° and a vertical angle of view of about 39° at an exit pupil diameter Φ of 6 mm and an image display size of about 10 mm×7.5 mm at the infinitive distance in the positive direction of the z-axis.

Further, the optical system of this numerical example may be utilized in an image taking optical system. In this case, light from an object point at the infinitive distance in the z-axis negative direction is guided to the first optical element 1 through the stop S1. Then, the light is incident on the first optical element 1 from S2, reflected on S3, reflected on S4, returned and reflected on S5 and reflected on S6 and, thereafter, exits S7 to be guided to the second optical element 2.

The light guided to the second optical element 2 exits the second optical element 2 from S8, is incident on the lens 21 from the surface S9 and exits from S10 to focus on the image taking surface SI.

According to the structure of this numerical example, a display optical system that is small and has a wide display angle of view can be attained. In particular, in this numerical example, the lens 21 is provided between the second optical element 2 and the image display surface SI and optical power of the relay optical system part is shared by a larger number of optical surfaces to control occurrence of an aberration. Thus, an optical performance can be increased compared with the structure shown in first Embodiment.

SEVENTH NUMERICAL EXAMPLE

Figure 23:
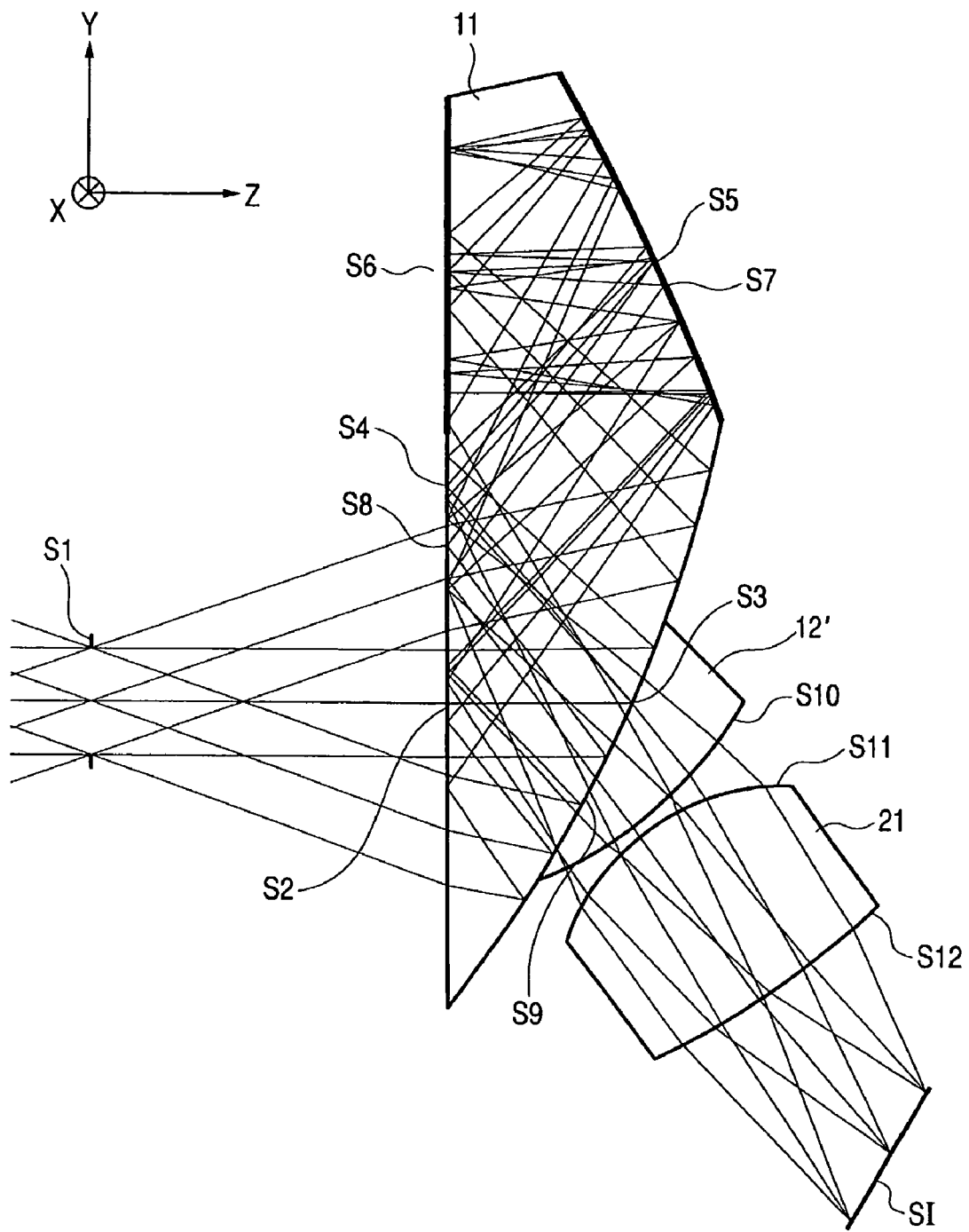
FIG. 23 is a sectional view of an optical system of seventh Numerical Example of the present invention.

FIG. 23 shows an optical path sectional view with a numerical example having a structure similar to tenth Embodiment shown in FIG. 16. In the figure, reference numeral 11 denotes a first optical element, which is constituted by a transparent body of a prism shape having three optical surfaces. Reference symbols S2, S4, S6 and S8 denote an identical surface; S3 and S9, an identical surface; and S5 and S7, an identical surface. These three surfaces correspond to the surfaces A, B and C described in fourth Embodiment, respectively.

Reference numeral 12' denotes a second optical element, which is formed in a lens shape having an exit surface S9, which is joined with a surface B (S3) of the first optical element 11, and an incident surface S10 in this context. Moreover, in second Numerical Example of the present invention, the display optical system has a lens 21 having an incident surface S12 and an exit surface S11. In the surface A, a reflective film is formed on a portion used as the return reflection surface S6. Reference symbol SI denotes an image display surface and S1 denotes an exit pupil S of the display optical system.

All the optical surfaces S to S12 are rotation asymmetrical surfaces, which are formed in a plane symmetrical shape having the paper surface of the figure (yz section) as an only symmetrical surface.

Further, x, y and z in the figure define a coordinate system with an optical axis direction of an observer as the z axis, a direction perpendicular to the z axis in the paper surface of the figure as the y axis, and a direction perpendicular to the paper surface as the x axis.

Optical data of this numerical example is shown in Table 7.

TABLE 7

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | |
| 2 | 0.000 | 0.044 | 20.096 | 0.044 | −1234.4360 | FFS 1 | 1.5709 | 33.8 |
| 3 | 0.000 | −1.315 | 29.782 | −25.238 | −68.5865 | FFS 2 | −1.5709 | 33.8 |
| 4 | 0.000 | 0.044 | 20.096 | 0.044 | −1234.4360 | FFS 1 | 1.5709 | 33.8 |
| 5 | 0.000 | 20.919 | 33.353 | 24.493 | −160.8344 | FFS 3 | −1.5709 | 33.8 |

TABLE 7-continued

| | | | | | | | | |
|---|---|---|---|---|---|---|---|---|
| 6 | 0.000 | 0.044 | 20.096 | 0.044 | −1234.4360 | FFS 1 | 1.5709 | 33.8 |
| 7 | 0.000 | 20.919 | 33.353 | 24.493 | −160.8344 | FFS 3 | −1.5709 | 33.8 |
| 8 | 0.000 | 0.044 | 20.098 | 0.044 | −1234.4360 | FFS 1 | 1.5709 | 33.8 |
| 9 | 0.000 | −1.315 | 29.782 | −25.238 | −68.5865 | FFS 2 | 1.5709 | 33.8 |
| 10 | 0.000 | −7.187 | 30.035 | −55.457 | −22.0382 | FFS 4 | 1.0000 | |
| 11 | 0.000 | −6.745 | 31.846 | −56.473 | 12.7154 | FFS 5 | 1.5709 | 33.8 |
| 12 | 0.000 | −16.017 | 38.561 | −57.018 | −41.1310 | FFS 6 | 1.0000 | |
| I | 0.000 | −25.669 | 44.825 | −33.264 | ∞ | SPH | 1.0000 | |

| | | | | | |
|---|---|---|---|---|---|
| FFS 1 | k: 7.4625e+001 | c5: −1.0479e−004 | c6: 4.4747e−005 | c10: 9.7603e−007 | |
| | c11: −1.9132e−006 | c12: −5.1145e−009 | c13: −7.1983e−009 | c14: −9.3785e−009 | |
| FFS 2 | k: −3.1420e−000 | c5: −5.9429e−004 | c6: −6.6185e−005 | c10: 1.6090e−006 | |
| | c11: −7.0606e−006 | c12: −5.3181e−008 | c13: 1.6734e−007 | c14: 9.3791e−008 | |
| FFS 3 | k: −1.1200e−001 | c5: −5.5273e−004 | c6: −2.3569e−004 | c10: −8.2870e−006 | |
| | c11: 1.3693e−005 | c12: 8.1096e−007 | c13: −2.8958e−007 | c14: 5.2575e−007 | |
| FFS 4 | k: −1.0272e−001 | c5: −1.1879e−004 | c6: 3.3384e−004 | c10: −1.2706e−005 | |
| | c11: 5.9066e−006 | c12: 4.3791e−006 | c13: −4.4866e−007 | c14: 2.9728e−007 | |
| FFS 5 | k: −4.9079e−001 | c5: 8.4232e−005 | c6: 1.0038e−004 | c10: −7.4539e−006 | |
| | c11: −1.5236e−005 | c12: 1.3952e−006 | c13: 3.0224e−007 | c14: −9.3174e−007 | |
| FFS 6 | k: −4.3066e+000 | c5: −6.8269e−004 | c6: −2.5244e−004 | c10: −3.0901e−005 | |
| | c11: −6.4087e−005 | c12: −1.3215e−006 | c13: 1.7841e−006 | c14: 1.7019e−006 | |

As it is seen from Table 7, light from the image display surface SI passes through the surfaces S12 and S11 of the lens 21 and travels toward the second optical element 12'. The light traveling toward the second optical element 12' is incident on the second optical element 12' from the surface S10, transmitted through the joined surface S9 of the second optical element 12' and the first optical element 11 and incident on the first optical element 11, totally reflected on S8, reflected by the rear surface on S7, to which a reflective film is applied, reflected substantially vertically and returned on the surface S6 corresponding to the reflective film formation part of the surface A, reflected by the rear surface on S5, to which a reflective film is applied, totally reflected on S4, reflected by the rear surface on S3, transmitted through S2 and exits from the first optical element 11 to be guided to the exit pupil S1 of the optical system.

When it is assumed that a numerical value having a dimension in length of Seventh Numerical Example is represented by mm, a display optical system is obtained which displays an image with a horizontal angle of view of about 50° and a vertical angle of view of about 39° at an exit pupil diameter Φ of 6 mm and an image display size of around 10 mm×7.5 mm in the infinity in the positive direction of the z axis.

Further, the optical system of this numerical example may be utilized in an image taking optical system. In this case, a ray from an object point at the infinity in the z axis negative direction is guided to the first optical element 11 through the stop S1. Then, the ray is incident on the first optical element 11 from S2, reflected on S3, reflected on S4, reflected on S5 and reflected on S6 to be returned therefrom and, thereafter, reflected on S7, reflected on S8 and exits the first optical element 11 from S9 to be guided to the second optical element 12'.

The light guided to the second optical element 12' passes through S10 and exits from the second optical element 12' to be incident on the lens 21 from the surface S12 and exits from S12 to focus on the image taking surface SI.

According to the structure of this numerical example, a display optical system that is small and has a wide display angle of view can be attained. Further, in this numerical example as well, as in sixth Numerical Example, the lens 21 is provided between the second optical element 12' and the image display surface SI and optical power of the relay optical system part is shared by a large number of optical surfaces to control occurrence of an aberration. Thus, a high optical performance can be easily obtained.

In addition, since the number of times of reflection for forming a forward and backward optical path in the first optical element 11 is increased compared with sixth Numerical Example, optical path lengths are duplicated more effectively and the display optical system can be made compact with respect to a long optical path length.

EIGHTH NUMERICAL EXAMPLE

Figure 24:
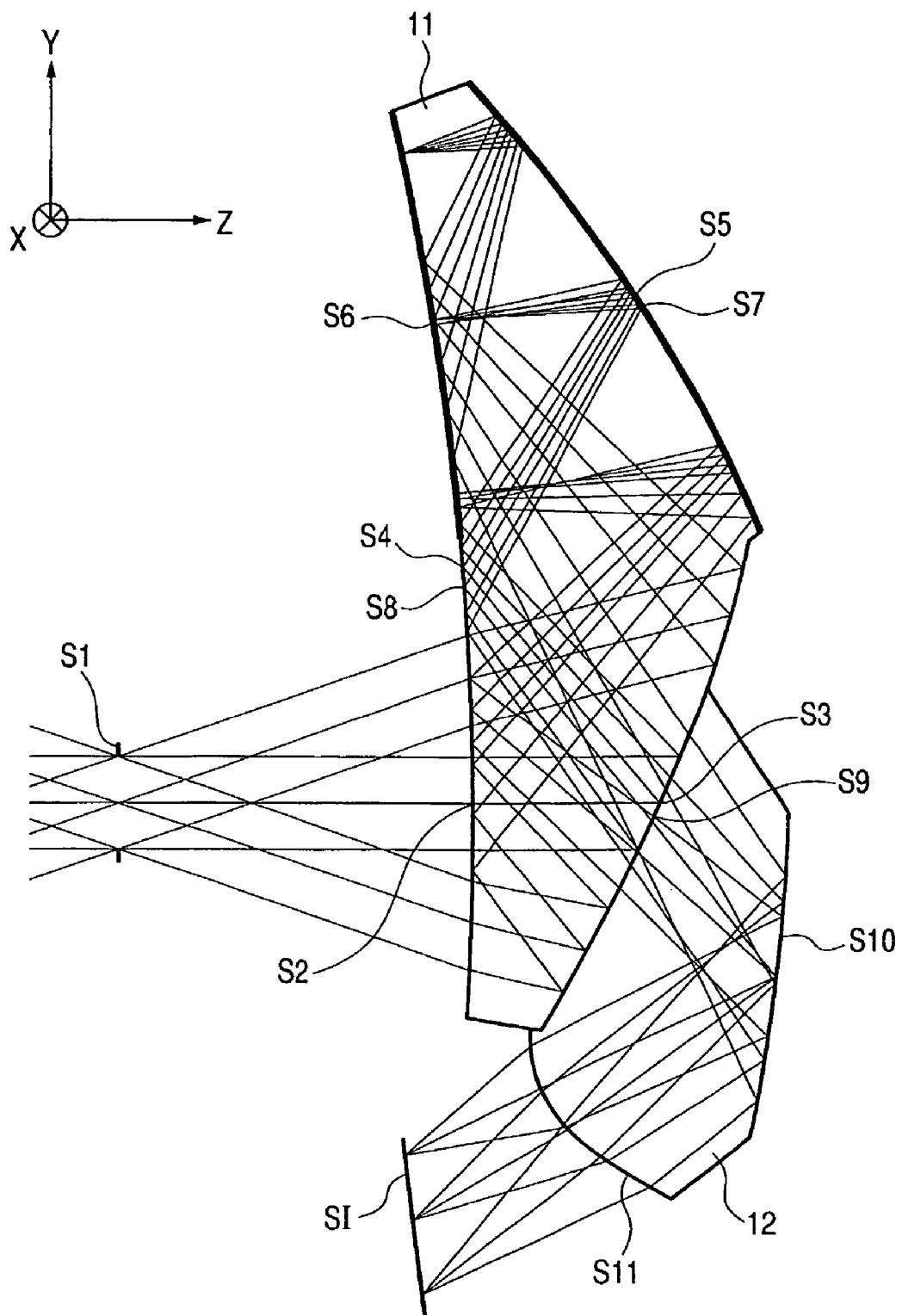
FIG. 24 is a sectional view of an optical system of eighth Numerical Example of the present invention.

FIG. 24 shows an optical path sectional view with a numerical example of tenth Embodiment shown in FIG. 16. In the figure, reference numeral 11 denotes a first optical element, which is constituted by a transparent body of a prism shape having three optical surfaces. Reference symbols S2, S4, S6 and S8 denote an identical surface; S3 and S9, an identical surface; and S5 and S7, an identical surface. These three surfaces correspond to the surfaces A, B and C described in tenth Embodiment, respectively.

Reference numeral 12 denotes a second optical element, which is constituted by a transparent body of a prism shape having an exit surface S9, which is joined with a surface B (S3) of the first optical element 11, a reflective surface S10, and an incident surface S11 in this context. Reflective films are formed on the upper part of the surface A and on the surface C. Reference symbol SI denotes an image display surface and S1 denotes an exit pupil S of the display optical system.

In this numerical example, all the optical surfaces S1 to S11 are rotation asymmetrical surfaces, which are formed in a plane symmetrical shape having the paper surface of the figure (yz section) as an only symmetrical surface.

Further, x, y and z in the figure define a coordinate system with an optical axis direction of an observer as the z axis, a direction perpendicular to the z axis in the paper surface of the figure as the y axis, and a direction perpendicular to the paper surface as the x axis.

Optical data of eighth Numeral Example is shown in Table 8.

TABLE 8

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | |
| 2 | 0.000 | −2.017 | 23.721 | −0.171 | −245.4672 | XYP 1 | 1.5745 | 33.8 |
| 3 | 0.000 | −3.122 | 35.205 | −26.562 | −128.8157 | XYP 2 | −1.5745 | 33.8 |
| 4 | 0.000 | −2.017 | 23.721 | −0.171 | −245.4672 | XYP 1 | 1.5745 | 33.8 |
| 5 | 0.000 | 18.804 | 43.025 | 24.344 | −105.3802 | XYP 3 | −1.5745 | 33.8 |
| 6 | 0.000 | −2.017 | 23.721 | −0.171 | −245.4672 | XYP 1 | 1.5745 | 33.8 |
| 7 | 0.000 | 18.804 | 43.025 | 24.344 | −105.3802 | XYP 3 | −1.5745 | 33.8 |
| 8 | 0.000 | −2.017 | 23.721 | −0.171 | −245.4672 | XYP 1 | 1.5745 | 33.8 |
| 9 | 0.000 | −3.122 | 35.205 | −26.562 | −128.8157 | XYP 2 | −1.5745 | 33.8 |
| 10 | 0.000 | −10.367 | 44.389 | −7.226 | −119.4891 | XYP 4 | −1.5745 | 33.8 |
| 11 | 0.000 | −20.495 | 29.165 | 35.804 | 7.9905 | XYP 5 | −1.0000 | |
| I | 0.000 | −27.575 | 19.351 | 7.125 | ∞ | SPH | −1.0000 | |

| | | | | |
|---|---|---|---|---|
| XYP1 | k: 2.9784E+00 | C4: 2.8264E−05 | C8: −3.1409E−05 | C8: −4.5685E−07 |
| | C10: −7.1561E−07 | C11: 3.7060E−08 | C13: −2.8721E−07 | C15: −6.8961E−09 |
| XYP2 | k: 8.8003E−02 | C4: 8.6003E−04 | C6: −1.1430E−03 | C3: −1.3851E−05 |
| | C10: −2.7745E−06 | C11: −2.0171E−06 | C13: −1.3089E−08 | C15: 6.6363E−08 |
| XYP3 | k: −1.7520E−01 | C4: −1.8633E−04 | C6: 2.3328E−04 | C8: −1.4100E−05 |
| | C10: 1.7634E−06 | C11: 4.3513E−07 | C13: 2.2207E−07 | C15: −9.4853E−08 |
| XYP4 | k: −4.5724E+01 | C4: −2.8501E−03 | C8: −7.8220E−04 | C8: 8.4696E−05 |
| | C10: 6.8148E−05 | C11: 1.2817E−05 | C13: 1.4279E−06 | C15: −6.1597E−07 |
| XYP5 | k: −7.4878E−01 | C4: 9.4461E−03 | C8: −6.2866E−03 | C8: 2.6085E−03 |
| | C10: 2.5324E−03 | C11: −1.5313E−04 | C13: −2.1340E−04 | C15: −7.6754E−05 |

As it is seen from Table 8, light from the image display surface SI is incident on the second 10 optical element 12 from S11, reflected on S10, transmitted through the joined surface S9 of the second optical element 12 and the first optical element 11 and incident on the first optical element 11, totally reflected on S8, reflected by the rear surface on S7, to which a reflective film is applied, substantially vertically reflected on S6 corresponding to the reflective film formation part of the surface A, to be returned, reflected by the rear surface on S5, to which a reflective film is applied, totally reflected on S4, reflected by the rear surface on S3, transmitted through S2 and exits from the first optical element 11 to be guided to the exit pupil S1 of the optical system.

When it is assumed that a numerical value having a dimension in length of this numerical example is represented by mm, a display optical system is obtained which displays an image with a horizontal angle of view of about 50° and a vertical angle of view of about 39° at an exit pupil diameter Φ of 6 mm and an image display size of around 10 mm×7.5 mm in the infinity in the positive direction of the z axis.

Further, the optical system of this numerical example may be utilized in an image taking optical system. In this case, a ray from an object point at the infinity in the z axis negative direction is guided to the first optical element 11 through the stop S1. Then, the ray is incident on the first optical element 11 from S2, reflected on S3, reflected on S4, reflected on S5 and reflected on S6 to be returned and, thereafter, reflected on S7, reflected on S8 and exits from S9 to be guided to the second optical element 12.

The light beam guided to the second optical element 12 is reflected on S10, transmitted through S11, and exits from the second optical element 12 to focus on the image taking surface SI.

According to the structure of this numerical example, a display optical system that is small and has a wide display angle of view can be realized. In addition, in this numerical example, since the prism-like optical element is used as the second optical element 12 and an optical path is returned by rear surface reflection, the second optical element 12 can be made thinner compared with sixth and seventh Numerical Examples.

NINTH NUMERICAL EXAMPLE

Figure 25:
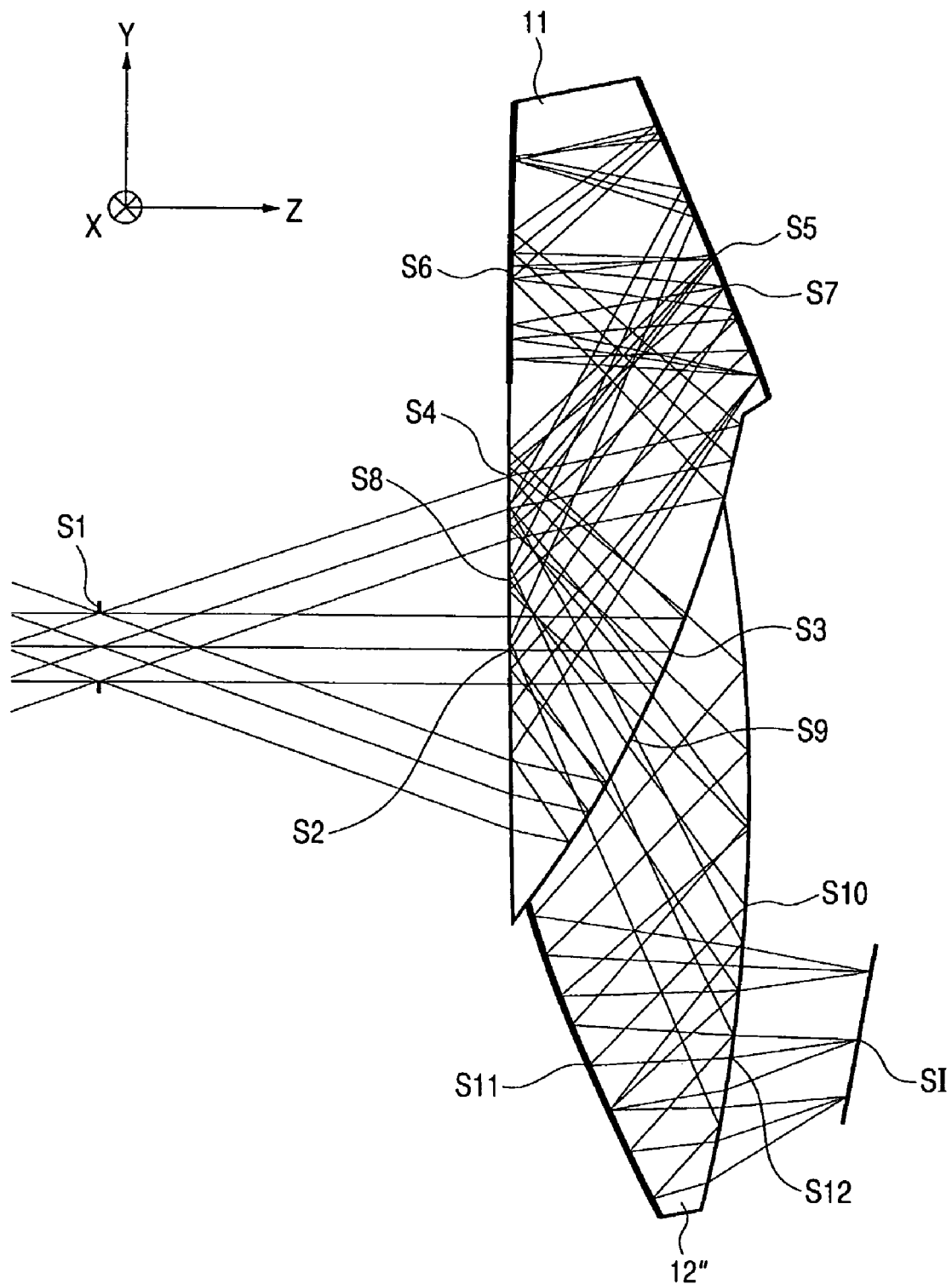
FIG. 25 is a sectional view of an optical system of ninth Numerical Example of the present invention.
Figure 26:
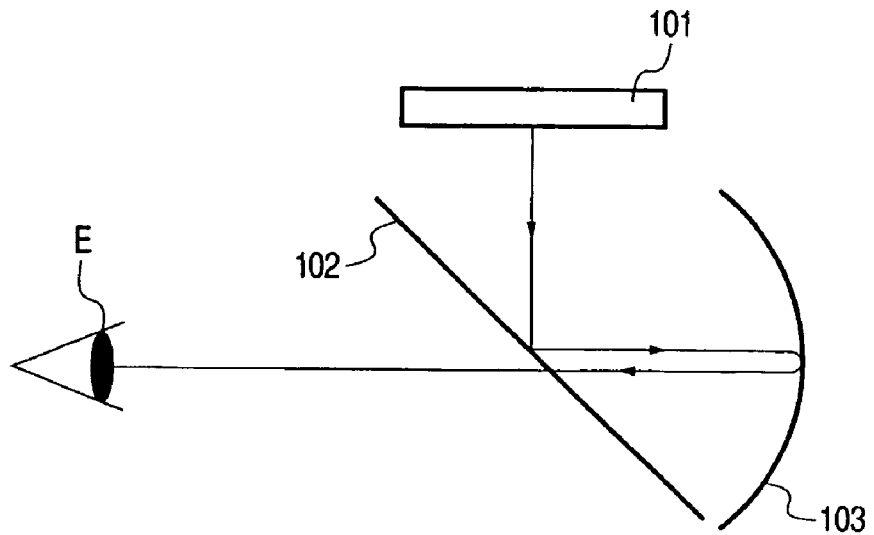
FIG. 26 is a diagram of a conventional display optical system.
Figure 27:
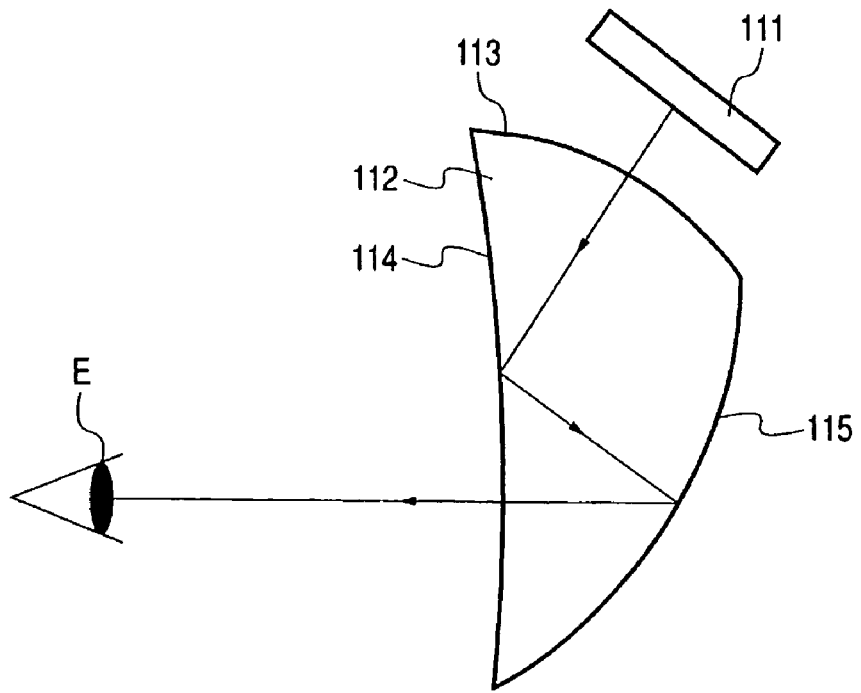
FIG. 27 is a diagram of the conventional display optical system.

FIG. 25 shows an optical path sectional view with a numerical example having a similar structure of tenth Embodiment shown in FIG. 16. In the figure, reference numeral 11 denotes a first optical element, which is constituted by a transparent body of a prism shape having three optical surfaces. Reference symbols S2, S4, S6 and S8 denote an identical surface; S3 and S9, an identical surface; and S5 and S7, an identical surface. These three surfaces correspond to the surfaces A, B and C described in tenth Embodiment, respectively.

Reference numeral 12" denotes a second optical element, which is constituted by a transparent body of a prism shape having an exit surface S9, which is joined with a surface B (S3) of the first optical element 11, a reflection surface S11, and a reflection and incident surface S10 (identical surface with S12) in this context. Reflective films are formed on the upper part of the surface A and on the surfaces C and S11. Reference symbol SI denotes an image display surface and S1 denotes an exit pupil S of the display optical system.

In this numerical example, all the optical surfaces S1 to S12 are rotation asymmetrical surfaces, which are formed in a plane symmetrical shape having the paper surface of the figure (yz section) as an only symmetrical surface.

Further, x, y and z in the figure define a coordinate system with an optical axis direction of an observer as the z axis, a direction perpendicular to the z axis in the paper surface of the figure as the y axis, and a direction perpendicular to the paper surface as the x axis.

Optical data of this numerical example is shown in Table 9.

TABLE 9

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | |
| 2 | 0.000 | −0.145 | 25.284 | 0.327 | 2170.5726 | FFS 1 | 1.5745 | 33.8 |
| 3 | 0.000 | −1.158 | 34.957 | −24.052 | −81.7957 | FFS 2 | −1.5745 | 33.8 |
| 4 | 0.000 | −0.145 | 25.284 | 0.327 | 2170.5726 | FFS 1 | 1.5745 | 33.8 |
| 5 | 0.000 | 22.297 | 39.060 | 24.097 | −281.4465 | FFS 3 | −1.5745 | 33.8 |
| 6 | 0.000 | −0.145 | 25.284 | 0.327 | 2170.5726 | FFS 1 | 1.5745 | 33.8 |
| 7 | 0.000 | 22.297 | 39.060 | 24.097 | −281.4465 | FFS 3 | −1.5745 | 33.8 |
| 8 | 0.000 | −0.145 | 25.284 | 0.327 | 2170.5726 | FFS 1 | 1.5745 | 33.8 |
| 9 | 0.000 | −1.158 | 34.957 | −24.052 | −81.7957 | FFS 2 | 1.5745 | 33.8 |
| 10 | 0.000 | 1.248 | 40.197 | 5.851 | −90.5119 | FFS 4 | −1.5745 | 33.8 |
| 11 | 0.000 | −30.776 | 32.911 | 27.481 | 76.4135 | FFS 5 | 1.5745 | 33.8 |
| 12 | 0.000 | 1.248 | 40.197 | 5.851 | −90.5119 | FFS 4 | 1.0000 | |
| I | 0.000 | 2.542 | 52.830 | −11.290 | ∞ | SPH | 1.0000 | |

| | | | | |
|---|---|---|---|---|
| FFS 1 | k: 1.9253e+003 | c5: −7.1116e−005 | c6: 1.9465e−005 | c10: −3.8850e−007 |
| | c11: −2.6451e−006 | c12: 2.7313e−008 | c13: −2.4049e−009 | c14: −2.0847e−009 |
| FFS 2 | k: −1.7103e−001 | c5: 5.6139e−004 | c6: 1.6604e−004 | c10: 8.9327e−006 |
| | c11: 2.5092e−006 | c12: 4.4735e−008 | c3: 1.4906e−007 | c14: 4.5647e−008 |
| FFS 3 | k: −1.3575e+002 | c5: 5.3486e−005 | c6: −3.6544e−005 | c10: 7.3638e−006 |
| | c11: −1.6058e−005 | c12: 1.4886e−007 | c13: −3.8685e−007 | c14: 5.3018e−008 |
| FFS 4 | k: 6.0706e−001 | c5: −4.0301e−005 | c6: −8.2323e−005 | c10: 1.1519e−008 |
| | c11: 1.1707e−005 | c12: 6.6198e−007 | c13: −1.7663e−008 | c14: −2.1384e−006 |
| FFS 5 | k: −5.8720e+000 | c5: 1.7109e−003 | c6: 7.5029e−004 | c10: 4.5381e−006 |
| | c11: 3.1062e−005 | c12: 2.0554e−007 | c13: 3.4681e−007 | c14: −1.9753e−007 |

As it is seen from Table 9, light from the image display surface SI travels toward the second optical element 12". The light traveling toward the second optical element 12" is incident on the second optical element 12" from the surface S12, reflected on S11 reflected on S10, and travels toward the joined surface S9 with the first optical element 11. The light incident on the first optical element 11 from the surface S9 is totally reflected on S8, reflected by the rear surface on S7, to which a reflective film is applied, reflected substantially vertically on the surface S6 corresponding to the reflective film formation part of the surface A, to be returned, and then, reflected by the rear surface on S5, to which a reflective film is applied, totally reflected on S4, reflected by the rear surface on S3, transmitted through S2 and exits from the first optical element 11 to be guided to the exit pupil S1 of the optical system.

When it is assumed that a numerical value having a dimension in length of this numerical example is represented by mm, a display optical system is obtained which displays an image with a horizontal angle of view of about 50° and a vertical angle of view of about 39° at an exit pupil diameter φ of 4 mm and an image display size of around 10 mm×7.5 mm at the infinitive distance in the positive direction of the z axis.

Further, the optical system of this numerical example may be utilized in an image taking optical system. In this case, a ray from an object point at the infinitive distance in the z-axis negative direction is guided to the first optical element 11 through the stop S1. Then, the ray is incident on the first optical element 11 from S2, reflected on S3, reflected on S4, reflected on S5 and reflected on S6 to be returned and, thereafter, reflected on S7, reflected on S8 and exits from S9 to be guided to the second optical element 12".

The light beam guided to the second optical element 12" is reflected on S10 and S11 and exits the second optical element 12" from S12 to focus on the image taking surface SI.

According to the structure of this numerical example, a display optical system that is small and has a wide display angle of view can be realized. In addition, in this numerical example, since the prism-like optical element is used as the second optical element 12" and an optical path is returned twice by rear surface reflection, the second optical element 12" can be made thinner compared with sixth, seventh and eighth Numerical Examples.

What is claimed is:

1. An image display apparatus comprising:
   a display for displaying an original image; and
   a display optical system for guiding light from the original image to an eye of an observer or a surface to have an image projected thereon, said display optical system comprising:
   a first optical system including: a first surface that is formed on a transparent body and has at least a reflecting action; a second surface for reflecting the light reflected on said first surface toward said first surface again; and a third surface for transmitting the light from the original image, which is formed on said transparent body,
   wherein the light transmitted through said third surface travels toward said first surface and is reflected for the first time on said first surface, and a principal ray at central angle of view to be reflected for the last time on said first surface is reflected and travels to a side opposite to a side of the first reflection on said first surface with respect to each normal line of said first surface on each hit point thereof; and
   a second optical system for guiding the light from the original image to said third surface.

2. An image display apparatus according to claim 1, wherein said display optical system forms an intermediate image of the original image in said first optical system.

3. An image display apparatus according to claim 1, wherein at least one of said first to third surfaces is a surface of a rotation asymmetrical shape.

4. An image display apparatus according to claim 1, wherein said second surface is formed on a member different from said transparent body.

5. An image display apparatus according to claim 1, wherein the light is subjected to total internal reflection on said first surface.

6. An image display apparatus according to claim 1, wherein the light made incident on said first optical system follows an optical path in order in which the light is transmitted through said third surface, reflected on said first surface reflected on said second surface, reflected on said first surface, reflected on said third surface and transmitted through said first surface to exit said first optical system.

7. An image taking apparatus comprising:
a photoelectric conversion element; and
an image taking optical system for guiding light from an object to said photoelectric conversion element and for forming an object image on an image taking surface of said photoelectric conversion element, said image taking optical system comprising:
a first optical system including: a first surface that is formed on a transparent body and has at least a reflecting action; a second surface for reflecting the light reflected on said first surface toward said first surface again; and a third surface for transmitting the light from the object, which is formed on said transparent body,
wherein the light reflected for the last time on said first surface travels toward said third surface and is transmitted through said third surface, and a principal ray at central angle of view to be reflected for the last time on said first surface is reflected and travels to a side opposite to a side of the first reflection on said first surface with respect to each normal line of said first surface on each hit point thereof; and
a second optical system for guiding the light from the object which has been transmitted through said third surface to said image taking surface.

8. An image taking apparatus according to claim 7, wherein said image taking optical system forms an intermediate image of the subject in said first optical system.

9. An image taking apparatus according to claim 7, wherein at least one of said first to third surfaces is a surface of a rotation asymmetrical shape.

10. An image taking apparatus according to claim 7, wherein said second surface is formed on a member different from said transparent body.

11. An image taking apparatus according to claim 7, wherein the light is subjected to total internal reflection on said first surface.

12. An image taking apparatus according to claim 7, wherein the light made incident on said first optical system follows an optical path in order in which the light is transmitted through said first surface, reflected on said third surface, reflected on said first surface, reflected on said second surface, reflected on said first surface and transmitted through said third surface to exit said first optical system.

* * * * *